United States Patent
Black et al.

(10) Patent No.: US 8,276,166 B2
(45) Date of Patent: *Sep. 25, 2012

(54) SYSTEM AND METHOD FOR PROVIDING INTEROPERABILITY BETWEEN DIFFERENT PROGRAMMING PROTOCOLS

(75) Inventors: Larry A. Black, Birmingham, AL (US); Ronald O. Pierce, Hoover, AL (US)

(73) Assignee: AT&T Intellectual Property I, L.P., Reno, NV (US)

(*) Notice: Subject to any disclaimer, the term of this patent is extended or adjusted under 35 U.S.C. 154(b) by 573 days.

This patent is subject to a terminal disclaimer.

(21) Appl. No.: 12/504,020

(22) Filed: Jul. 16, 2009

(65) Prior Publication Data

US 2009/0276794 A1    Nov. 5, 2009

Related U.S. Application Data

(63) Continuation of application No. 10/341,613, filed on Jan. 14, 2003, now Pat. No. 7,574,714.

(60) Provisional application No. 60/405,598, filed on Aug. 23, 2002.

(51) Int. Cl.
    *G06F 9/44*          (2006.01)
    *G06F 15/16*       (2006.01)
(52) U.S. Cl. .................... 719/330; 709/203
(58) Field of Classification Search .............. 719/330; 709/203
See application file for complete search history.

(56) References Cited

U.S. PATENT DOCUMENTS

| | | | |
|---|---|---|---|
| 6,269,373 B1 | 7/2001 | Apte et al. | |
| 6,418,447 B1 | 7/2002 | Frey et al. | |
| 6,442,564 B1 | 8/2002 | Frey et al. | |
| 6,473,748 B1* | 10/2002 | Archer | 706/45 |
| 6,502,103 B1 | 12/2002 | Frey et al. | |
| 6,567,818 B1 | 5/2003 | Frey et al. | |
| 6,591,272 B1* | 7/2003 | Williams | 1/1 |
| 6,697,849 B1* | 2/2004 | Carlson | 709/219 |
| 6,804,818 B1 | 10/2004 | Codella et al. | |
| 6,845,503 B1* | 1/2005 | Carlson et al. | 717/166 |
| 6,859,834 B1* | 2/2005 | Arora et al. | 709/227 |
| 6,901,588 B1 | 5/2005 | Krapf et al. | |
| 6,959,307 B2 | 10/2005 | Apte | |
| 6,961,735 B2 | 11/2005 | Gargya et al. | |
| 6,973,657 B1 | 12/2005 | Ahmad et al. | |
| 7,051,316 B2 | 5/2006 | Charisius et al. | |
| 7,136,857 B2* | 11/2006 | Chen et al. | 1/1 |
| 7,206,827 B2* | 4/2007 | Viswanath et al. | 709/220 |
| 7,209,921 B2* | 4/2007 | Pace et al. | 1/1 |

(Continued)

OTHER PUBLICATIONS

Bill Shannon of Sun Microsystems; Java TM 2 Platform—Enterprise Edition Specification, v1.4; Public Draft—Jul. 12, 2002; 240 pages.

(Continued)

*Primary Examiner* — Van Nguyen
(74) *Attorney, Agent, or Firm* — Thomas, Kayden, Horstemeyer & Risley, LLP

(57) ABSTRACT

Systems and methods for providing interoperability of systems are provided. One embodiment may be seen as instantiating a server in a container having instances of Enterprise Java™ Beans (EJB), and accessing the EJB through the local interface of the EJB. Since the EJB is accessed from within the container, the need for translation of messaging protocols at a bridge is removed. The server components are provided access to the EJB logic through the local interface of the EJB.

20 Claims, 16 Drawing Sheets

U.S. PATENT DOCUMENTS

| | | | |
|---|---|---|---|
| 7,574,714 | B2 | 8/2009 | Black |
| 8,073,935 | B2 * | 12/2011 | Viswanath .................. 709/221 |
| 2002/0099738 | A1 * | 7/2002 | Grant ........................... 707/513 |
| 2003/0014556 | A1 | 1/2003 | Conway |
| 2003/0093465 | A1 * | 5/2003 | Banerjee et al. .............. 709/203 |
| 2003/0158918 | A1 * | 8/2003 | Hanis ........................... 709/220 |
| 2003/0182550 | A1 | 9/2003 | Chen et al. |

OTHER PUBLICATIONS

Bill Shannon of Sun Microsystems; Java TM 2 Platform—Enterprise Edition Specification, v1.3; Final Release—Jul. 27, 2001; 411 pages.

Linda G. DeMichiel of Sun Microsystems; Enterprise JavaBeans TM Specification, Version 2.1, Proposed Final Draft—Aug. 2, 2002; pp. 1-640.

Black; Final Rejection mailed May 29, 2008 for U.S. Appl. No. 10/341,613, filed Jan. 14, 2003

Black; Non-Final Rejection mailed Nov. 13, 2008 for U.S. Appl. No. 10/341,613, filed Jan. 14, 2003.

Black; Notice of Allowance mailed Apr. 30, 2009 for U.S. Appl. No. 10/341,613, filed Jan. 14, 2003.

Black; Non-Final Rejection mailed Mar. 20, 2007 for U.S. Appl. No. 10/341,613, filed Jan. 14, 2003.

Black; Final Rejection mailed Sep. 6, 2006 for U.S. Appl. No. 10/341,613, filed Jan. 14, 2003.

Black; Non-Final Rejection mailed Apr. 7, 2006 for U.S. Appl. No. 10/341,613, filed Jan. 14, 2003.

Black; U.S. Appl. No. 10/341,613, filed Jan. 14, 2003.

John, et al.; "Performance Evaluation of Enterprise Javabeans (EJB) Corba Adapter to Corbra Server Interoperability"; Jan. 2002; pp. 1-7.

Baker, et al.; "Positioning Corba, J2EE, Web Services and Other Middlewares"; Sep. 2001; pp. 359-360.

Orfali, et al.; "Instant Corba"; 1997; pp. 29-50.

Goldschmidt, et al.; "Exploring Enterprise Javabeans in the NIIIP Virtual Enterprise"; 1998 IEEE; pp. 124-135.

* cited by examiner

SYSTEM AND METHOD FOR PROVIDING INTEROPERABILITY BETWEEN DIFFERENT PROGRAMMING PROTOCOLS

CROSS-REFERENCE TO RELATED APPLICATIONS

This application is a continuation of U.S. patent application Ser. No. 10/341,613, filed Jan. 14, 2003, now issued as U.S. Pat. No. 7,574,714 on Aug. 11, 2009, which claims the benefit of U.S. provisional patent application Ser. No. 60/405,598, filed Aug. 23, 2002, both of which are incorporated herein by reference in their entireties.

FIELD OF INVENTION

The present invention relates generally to client-server-based computing and, more particularly, to systems and methods for providing interoperability between different programming protocols.

BACKGROUND

In order to overcome the problem of interoperability between different object-oriented programming (OOP) languages, systems and methods have been suggested, which provide for bridges between the incompatible OOP languages. In operation, a bridge includes a map that translates expressions from one protocol to a different protocol. Hence, conceptually, the bridge resides at the boundary of each different protocol (e.g., at the boundary of two systems having different protocols). Thus, when a first-protocol expression is generated, the bridge translates the first-protocol expression into a second-protocol expression. Similarly, when a second-protocol expression is generated, the bridge translates the second-protocol expression into a first-protocol expression. In this regard, a mapping of the expression takes place from one protocol to another for each expression that crosses the boundary between two different protocols.

As one may guess, in order to maintain this type of interoperability, the system must continually maintain the bridge between two protocols. Otherwise, in the absence of the bridge, interoperability is destroyed. Also, since the bridge is only as good as the map that translates between the differing protocols, the functionality of the system is limited by the protocol having less functionality (i.e., the "weaker" protocol).

As an alternative to translating expressions at a bridge, an end user may re-write one OOP client-side to become the another OOP client-side. However, this type of re-writing becomes tedious and cumbersome because each application would be re-written for each non-native platform with which interoperability is sought.

Given these inefficiencies associated with translating expressions from one protocol to another protocol using a bridge, a need exists in the industry for greater efficiency in providing interoperability between incompatible protocols.

SUMMARY

The present disclosure provides systems and methods for providing interoperability between different programming protocols.

Briefly described, one embodiment of a system includes various logic components, including logic configured to instantiate a server within an Enterprise Java™ Bean (EJB) container, and logic configured to access a local interface of the EJB from the instantiated server.

Preferred embodiments of the present invention can also be viewed as providing methods for providing interoperability between different programming protocols. In this regard, one embodiment of the method may be seen as instantiating a business-logic component within a container, instantiating a server within the container, and accessing the business-logic component from the instantiated server.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1A:
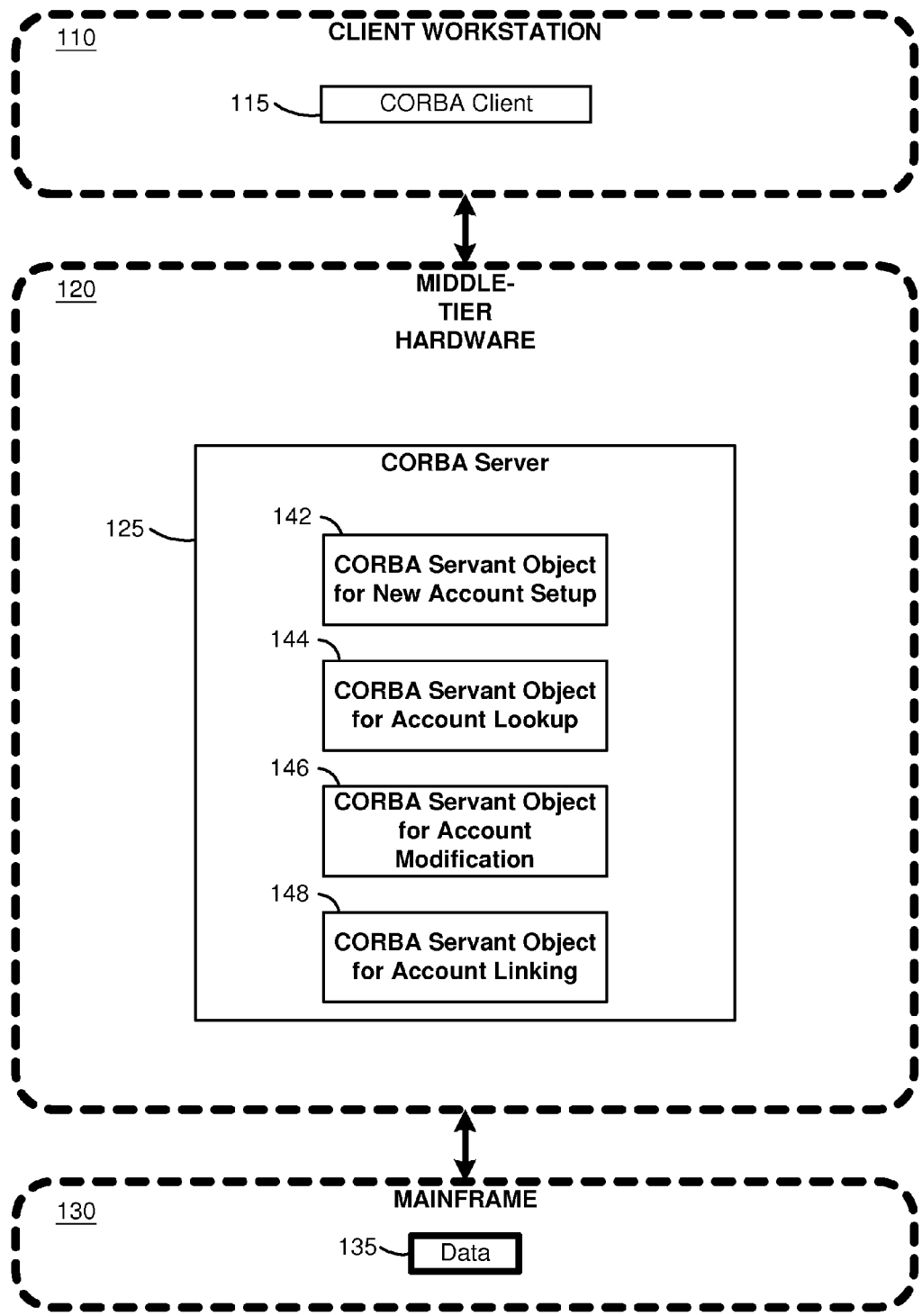
FIG. 1A is a block diagram showing an example of a client-server environment implemented using Common Object Request Broker Architecture (CORBA).

Having summarized various aspects of the present invention, reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents included within the spirit and scope of the invention.

Object-oriented programming (OOP) has become increasingly popular with the advent of the Internet and web-based applications. In representative OOP systems, a desired outcome is obtained as a result of interplay between a client, a request, and an object. A client is an entity that initiates the obtaining of a desired outcome; a request is a mechanism by which the client initiates a process; and an object is an identifiable, encapsulated entity that provides one or more services that can be requested by the client. Thus, in operation, when a client issues a request for a particular service, an object is created as an outcome of the issued request, and the object provides the service that was requested by the client. The outcome of object creation is revealed to the client in the form of an object reference, which denotes the newly created object. In this regard, the object reference reliably denotes a particular object and, specifically, the object reference typically identifies the same object each time that the same object reference is used in a request. For this reason, a particular object may be defined by its interface, which is a set of possible operations that a client may request of the object.

In an example OOP language, such as Common Object Request Broker Architecture (CORBA), a client accesses an object implementation through an object request broker (ORB). The ORB is responsible for all the mechanisms required to find the object implementation for the request, to prepare the object implementation to receive the request, and to communicate the data making up the request. Since these mechanisms are known, and also are described in "The Common Object Request Broker: Architecture and Specification, Version 3.0" (hereinafter "the CORBA specification"), only a truncated discussion of these mechanisms is provided here. The interface that the client sees is completely independent of where the object is located, independent of the programming language in which it is implemented, and independent of any other aspect that is not reflected in the object's interface. Given this transparency between clients and objects, accessing of the objects is governed by specific interface definitional languages (IDL) that define the exact mechanism for how requests invoke specific objects. In addition to having a specific IDL, CORBA has a specific network protocol that is defined for communication between objects. For example, an Internet inter-ORB protocol (IIOP) in CORBA may define the protocol for communication between ORBs. Further details on CORBA may be found in "The Common Object Request Broker: Architecture and Specification, Version 3.0" (hereinafter "the CORBA specification") by the Object Management Group of Needham, Mass., which is incorporated herein by reference as if set forth in its entirety.

A CORBA Client-Server Example

FIG. 1A is a block diagram showing an example system architecture of a CORBA-based system, which includes a client workstation 110, middle-tier hardware 120, and a mainframe 130. As shown in FIG. 1A, a CORBA client 115 is running on the client workstation 110, and data 135 is stored on the mainframe 130. In example environments, such as a telecommunications environment, the data 135 may include customer account information such as telephone numbers, addresses, billing codes, etc. The middle-tier hardware 120 is shown as having several examples of CORBA servant objects 142, 144, 146,148 that are instantiated in a CORBA server 125. As is known by those skilled in the art, and as described by the CORBA specification, these CORBA servant objects 142, 144, 146,148 may be instantiated at startup of the middle-tier hardware 120, or may be instantiated in response to requests generated by the CORBA client 115. Also, as known in the art, instantiation of objects refers to the process of defining a particular object and locating that particular object in some physical space (e.g., at a UNIX-based workstation). The client workstation 110 may be configured to communicate with the middle-tier hardware 120 through, for example, digital subscriber line (DSL) service, an integrated services digital network (ISDN) service, an analog dial-up service, ethernet, T-1, or any other service for transmitting data. In this regard, the client workstation 110 and the middle-tier hardware 120 may communicate using Transmission Control Protocol/Internet Protocol (TCP/IP). Similarly, the middle-tier hardware 120 and the mainframe 130 may communicate with each other using TCP/IP.

Figure 1B:
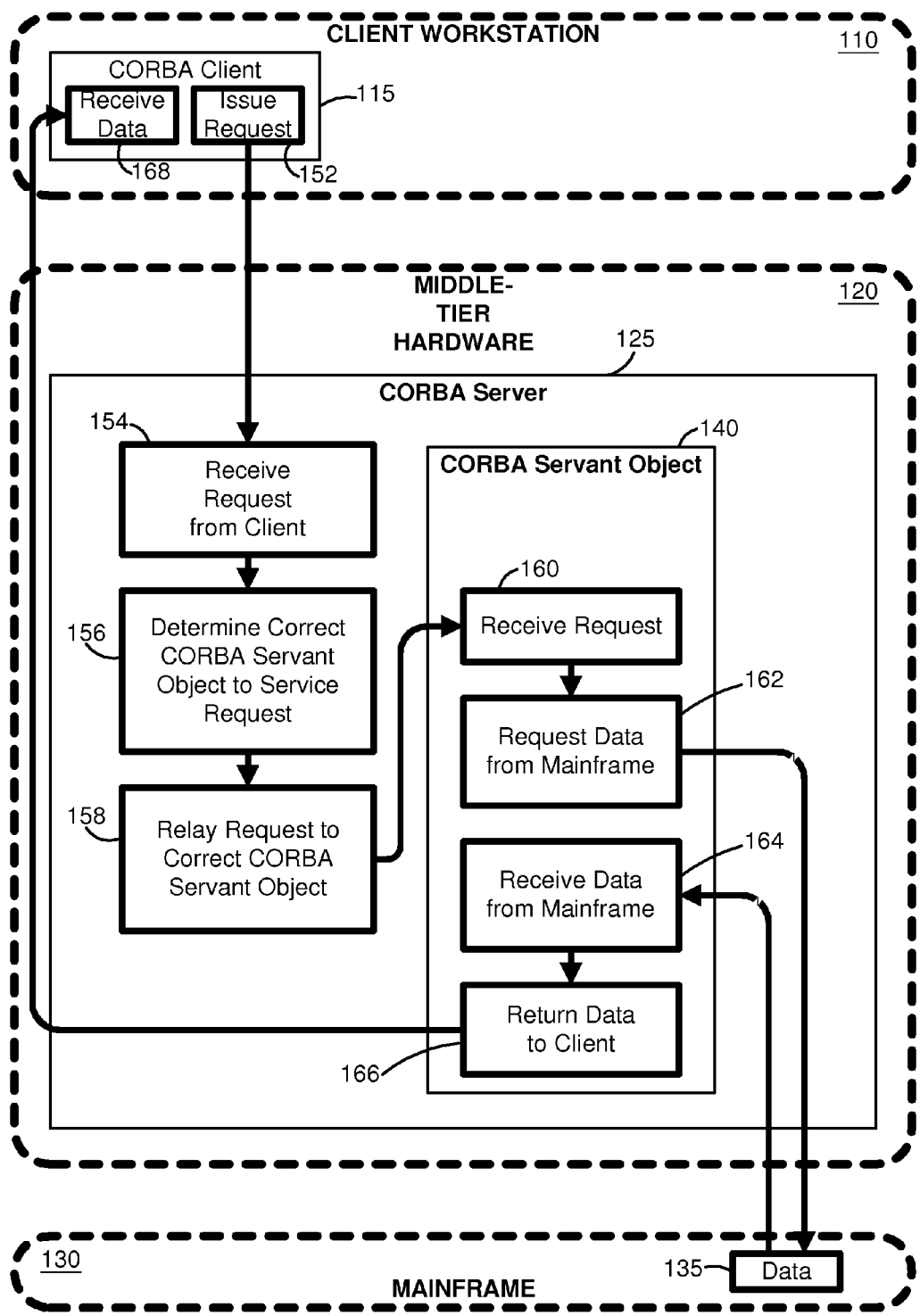
FIG. 1B is a block diagram showing an example of a request being serviced in the client-server environment of FIG. 1A.

FIG. 1B is a block diagram showing the execution of a request in the CORBA-based system of FIG. 1A. As shown in FIG. 1B, the CORBA client 115 at the client workstation 110 issues (152) a request to the CORBA server 125 at the middle-tier hardware 120. In example embodiments, such as telecommunication environments, the requests may include a request to setup a new account, a request to lookup an existing account, a request to modify an existing account, a request to link several separate accounts that belong to a common individual, etc. The CORBA server 125 receives (154) the request from the client 115 and determines (156) an appropriate CORBA servant object 140 to service the request. In this regard, if the request is to setup a new account, then the CORBA server 125 determines that a CORBA servant object for new account setup is the appropriate CORBA servant object. Similarly, if the request is to modify an existing account, then a CORBA servant object for modifying a new account would be the appropriate CORBA servant object. Since mechanisms for finding appropriate servant objects is known, and is also described in detail in the CORBA specification, further discussion of finding appropriate servant objects is omitted here.

In any event, upon determining (156) the appropriate CORBA servant object 140, the request is relayed (158) to the CORBA servant object 140. The CORBA servant object 140 receives (160) the request, and further requests (162) data 135 from the mainframe 130 to service the request. Thus, if the request is, for example, a request to modify an existing account, then the CORBA servant object 140 requests data related to the pertinent existing account from the mainframe 130. In response to the request (162), data 135 is received (164) from the mainframe 130, and the received (164) data 135 is returned (166) to the CORBA client 115, which receives (168) the data from the CORBA servant object 140.

Thus, as shown in FIGS. 1A and 1B, if an entire client-server system is written in a single OOP language, such as CORBA, then the request by a client and execution by a server are fairly straightforward.

The Distributed Network

As the client-server environment becomes increasingly complex with the addition of multiple clients, the computing power of the middle-tier hardware 120 becomes insufficient to efficiently handle the requests generated by the multiple clients. Thus, in order to distribute the computing burden, the server and its various components may be distributed over a plurality of middle-tier hardware components. In this regard, the server, as a whole, may be seen as residing on a plurality of middle-tier hardware machines. Examples of such distributed architecture are shown in FIGS. 2A and 2B.

Figure 2A:
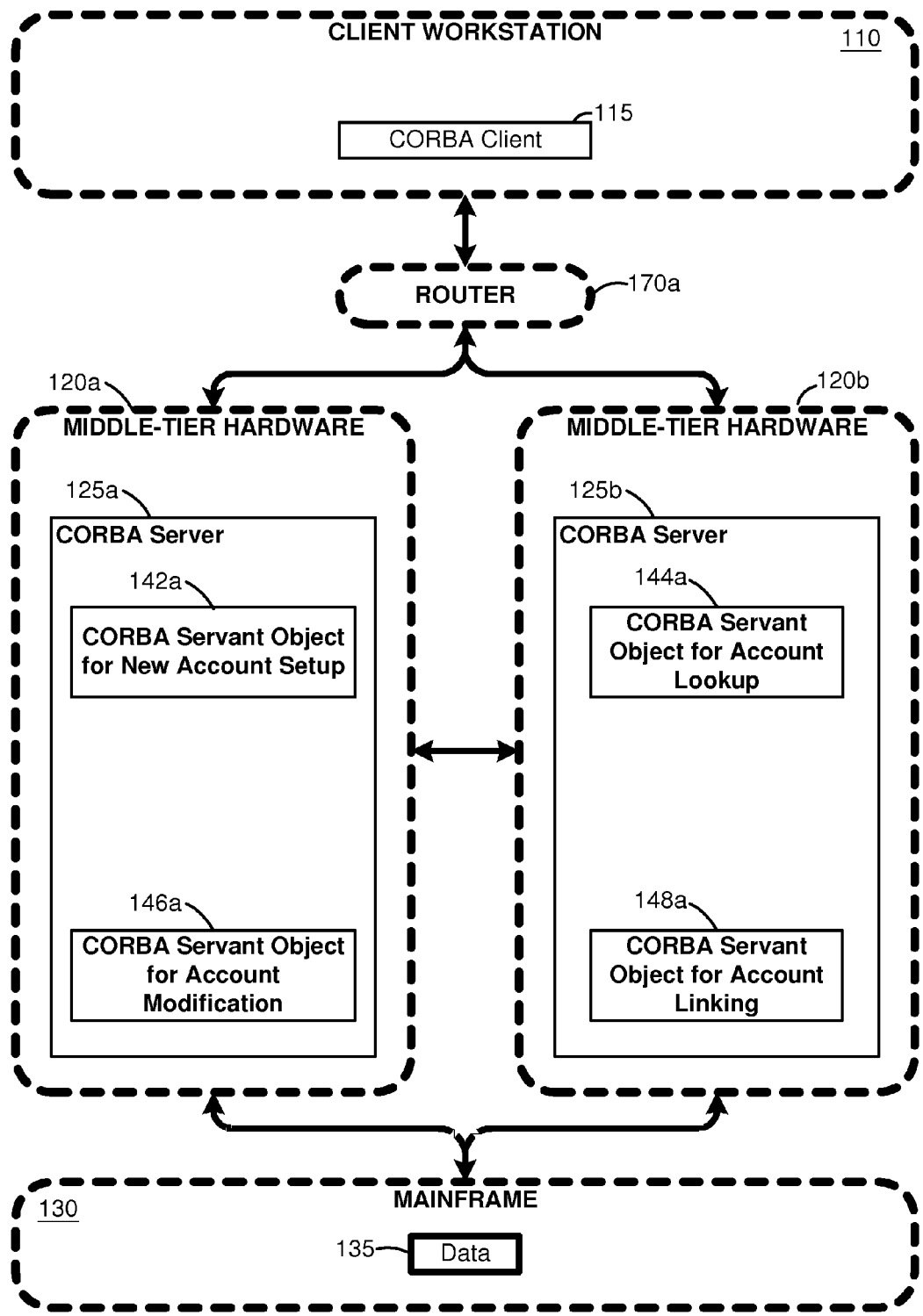
FIG. 2A is a block diagram showing an example of a distributed client-server environment implemented using CORBA.

As shown in FIG. 2A, the CORBA servant objects 142a, 146a, 144a, 148a, which were previously collocated in a single middle-tier hardware, are now divided into two separate middle-tier hardware components 120a, 120b. Thus, as shown in FIG. 2A, a CORBA server 125a having the CORBA servant object 142a for new account setup and the CORBA servant object 146a for account modification are located on the first middle-tier hardware 120a, while a CORBA server 125b having the CORBA servant object 144a for account lookup and the CORBA servant object 148a for account linking are located on the second middle-tier hardware 120b. Thus, when the CORBA client 115 issues a request, the request is directed to a router 170a, which determines the middle-tier hardware 120a, 120b having the appropriate CORBA server 125a, 125b. The request is relayed to the appropriate CORBA server 125a, 125b by the router 170a, and the appropriate CORBA server 125a, 125b executes the received request.

Figure 2B:
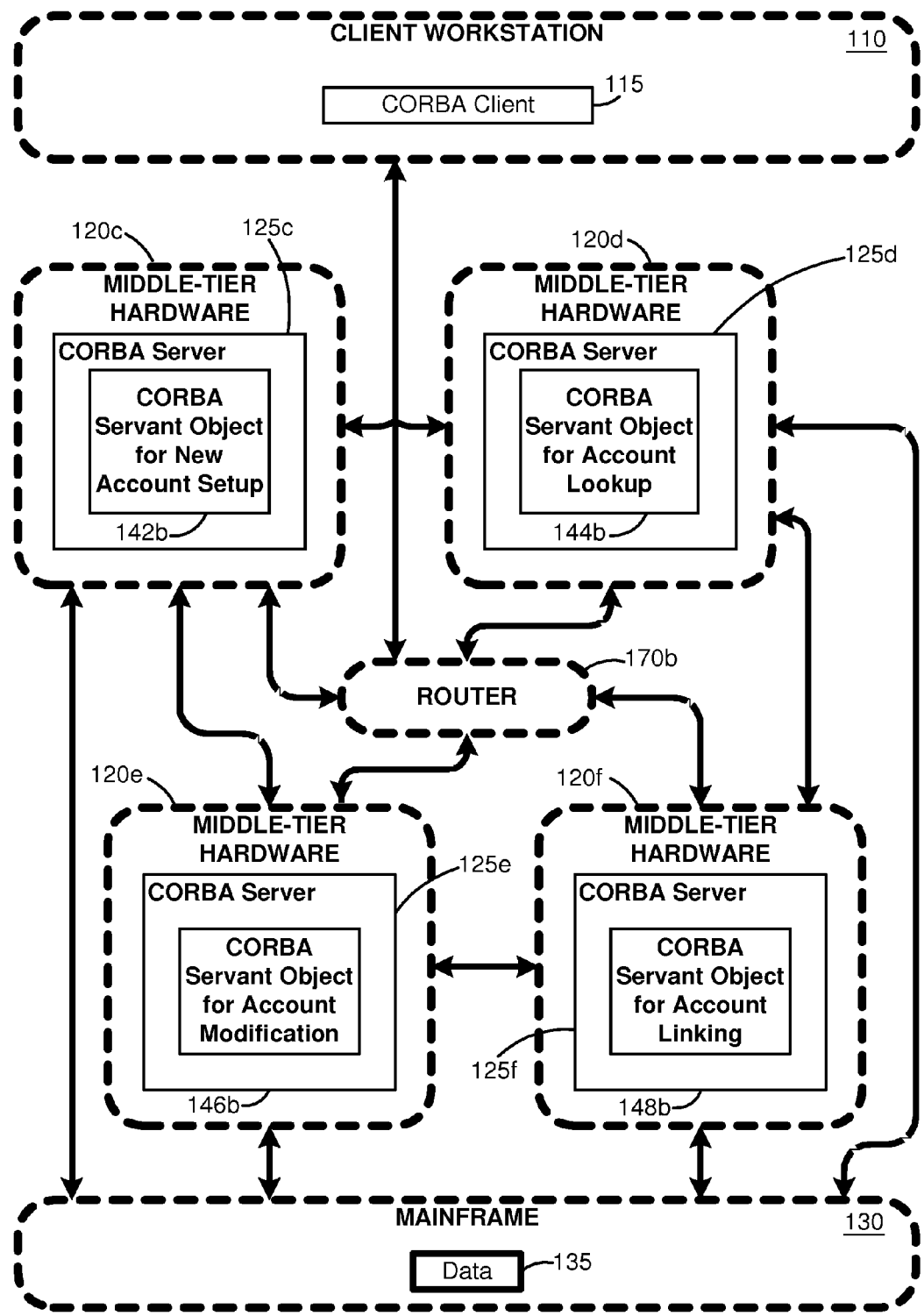
FIG. 2B is a block diagram showing another example of a distributed client-server environment implemented using CORBA.

As shown in another example in FIG. 2B, a CORBA server 125c, 125d, 125e, 125f associated with each CORBA servant object 142b, 144b, 146b, 148b is located at a different middle-tier hardware 120c, 120d, 120e, 120f. Thus, as shown in FIG. 2B, the computing power is now distributed over an even greater number of middle-tier hardware components.

As one can see from the examples of FIGS. 2A and 2B, the distributed network may encompass numerous middle-tier hardware components, which may each comprise a CORBA server having one or more CORBA servant objects. In this regard, the system may quickly become a complicated mesh of middle-tier hardware components connected to each other and, also, to a number of client workstations.

Despite its complexity, if the entire mesh of middle-tier hardware components is viewed as a single processing entity, then both FIGS. 2A and 2B may conceptually be reduced to the environment of FIGS. 1A and 1B.

The Added Complication of Interoperability in the Presence of Multiple Languages Other OOP languages, such as Java™, operate similarly in that a client issues a request for a service, and an object provides the service that was requested by the client. In this sense, accessing of the objects in Java™ is also governed by a specific Java™-based IDL that defines the exact mechanism for how requests would invoke specific objects. Furthermore, Java™ may define a different network protocol than the network protocol provided by CORBA. Further details of example Java™-based protocols may be found in "Java™ 2 Platform Enterprise Edition Specification, v1.3" (hereinafter "the J2EE specification") by Sun® Microsystems, and "Enterprise JavaBeans™ Specification, Version 2.1," (hereinafter "the EJB specification") by Sun® Microsystems, which are both incorporated herein by reference as if set forth in their entireties.

The presence of multiple languages may arise, for example, when an enterprise decides to migrate from one language to another language. For example, a telecommunication vendor, which was previously using CORBA business logic to implement all of its business functions, may decide to migrate to business logic implemented using EJB. In this type of scenario, a great inconvenience and cost would be presented to the telecommunications vendor in re-training the users of the business logic to migrate from one language to another. Additionally, it may only be practical to incrementally migrate from one language to another, rather than wholly changing the system overnight. For these and other reasons, it may often be necessary to provide interoperability between two languages so that the business logic may be replaced while the user interface to the business logic remains unchanged.

As one can imagine, since each OOP language may define its own IDL, and each OOP language may define its own network protocol, there may be as many IDLs and network protocols as there are OOP languages. Thus, for objects distributed over a network in which a plurality of different OOP languages coexist, if the different IDLs and different network protocols are incompatible with each other, then it becomes problematic to integrate one OOP language with another OOP language. An example system having both CORBA and Java™ is shown with reference to FIG. 3A.

Figure 3A:
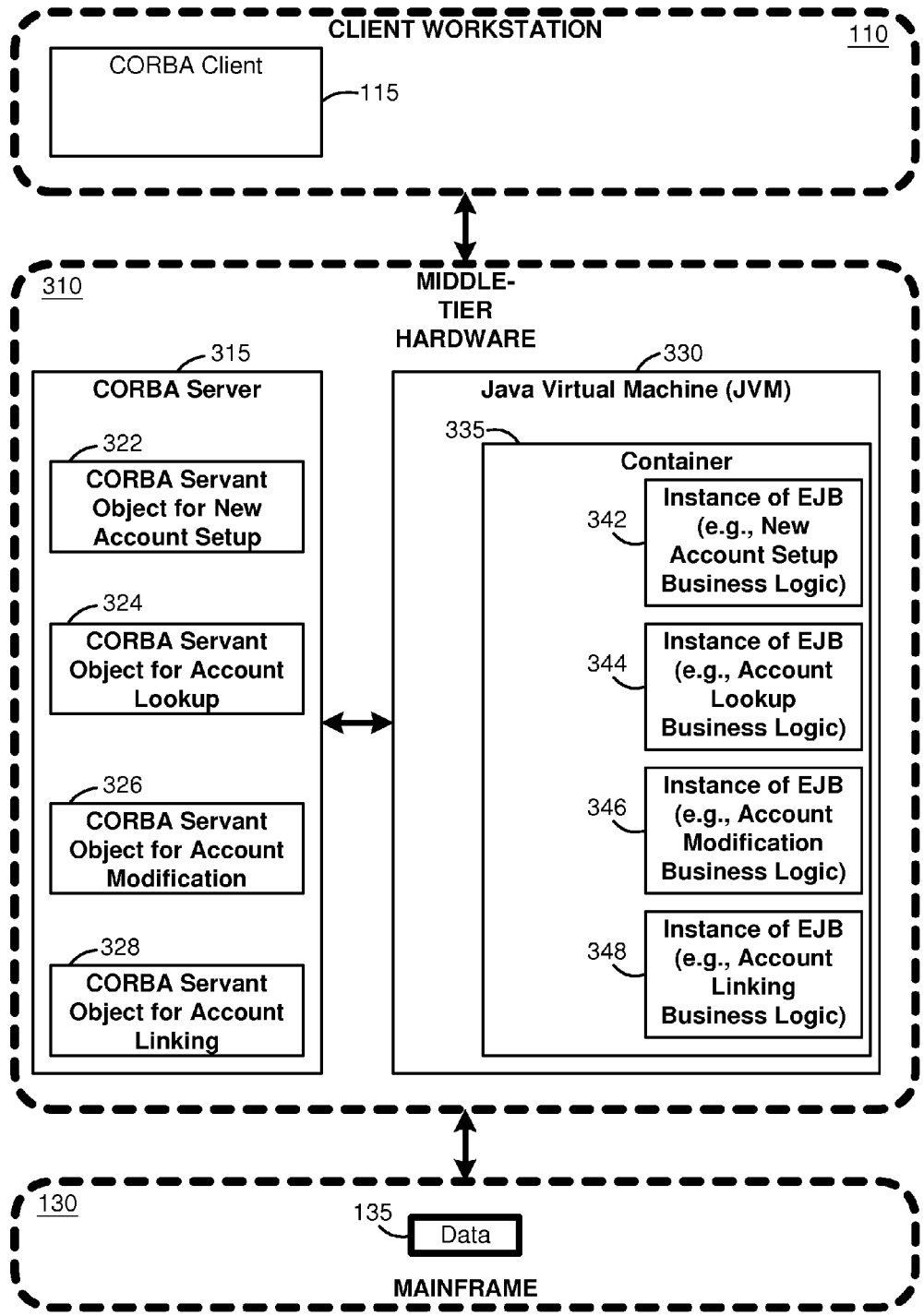
FIG. 3A is a block diagram showing an example of a client-server environment in which components implemented in multiple languages coexist.

As shown in FIG. 3A, an example system having both CORBA and Java™ includes a client workstation 110, middle-tier hardware 310, and a mainframe 130. In the example of FIG. 3A, a CORBA client 115 is located at the client workstation 110, and data 135 is located on the mainframe 130. Similar to FIG. 1A, if the environment is a telecommunication environment, then the data may include a customer's telephone number, address, billing code, etc. Unlike the pure CORBA environment of FIG. 1A, FIG. 3A shows both CORBA and Java™ software components located on the middle-tier hardware 310. In this regard, a CORBA server 315 having CORBA servant objects 322, 324, 326, 328 may be located on the middle-tier hardware 310, and multiple instances of Enterprise Java™ Beans (EJB) 342, 344, 346, 348 may be instantiated in a container 335 located on a Java™ Virtual Machine (JVM) 330 on the middle-tier hardware 310. As known by those skilled in the art, and as described in the J2EE and EJB specifications, the JVM 330 is a software execution engine that executes byte codes in a Java™ class file on a microprocessor (not shown), which may be on a computer or other electronic device (not shown). The container 335, as is known by those skilled in the art, is an entity that provides life cycle management, security, deployment, and runtime services to components. In other words, the container 335 is a run-time environment for applications in object-oriented programming. Each type of container (e.g., EJB container, Web container, Java™ Server Pages (JSP) container, servlet container, applet container, application client container, etc.) also provides component-specific services, as is known by those skilled in the art.

Thus, as shown in FIG. 3A, both CORBA and Java™ components may reside on one middle-tier hardware 310. As is known by those skilled in the art, and as described in the CORBA specification, the J2EE specification, and the EJB specification, each of the Java™ and CORBA components may be instantiated on the middle-tier hardware 310 during startup of the middle-tier hardware, or may be instantiated in response to requests generated by a client.

In order to overcome the problem of interoperability between different OOP languages, systems and methods have been suggested, which provide for bridges between the incompatible OOP languages. In operation, a bridge includes a map that translates expressions from one protocol to a different protocol. Hence, conceptually, the bridge resides at the boundary of each different protocol (e.g., at the boundary of two systems having different protocols). Thus, when a first-protocol expression is generated, the bridge translates the first-protocol expression into a second-protocol expression. Similarly, when a second-protocol expression is generated, the bridge translates the second-protocol expression into a first-protocol expression. In this regard, a mapping of the expression takes place from one protocol to another for each expression that crosses the boundary between two different protocols.

One example of such a mapping technique is demonstrated using a bridge between CORBA and Java™, specifically between CORBA and an Enterprise JavaBean™ (EJB). While the bridging protocol between CORBA and EJB is described in detail in chapters 12 through 15 of the CORBA specification, chapter 7 of the J2EE specification, and chapter 19 of the EJB specification, a short synopsis of the method is provided with reference to FIG. 3B to illustrate inefficiencies related to bridging.

Figure 3B:
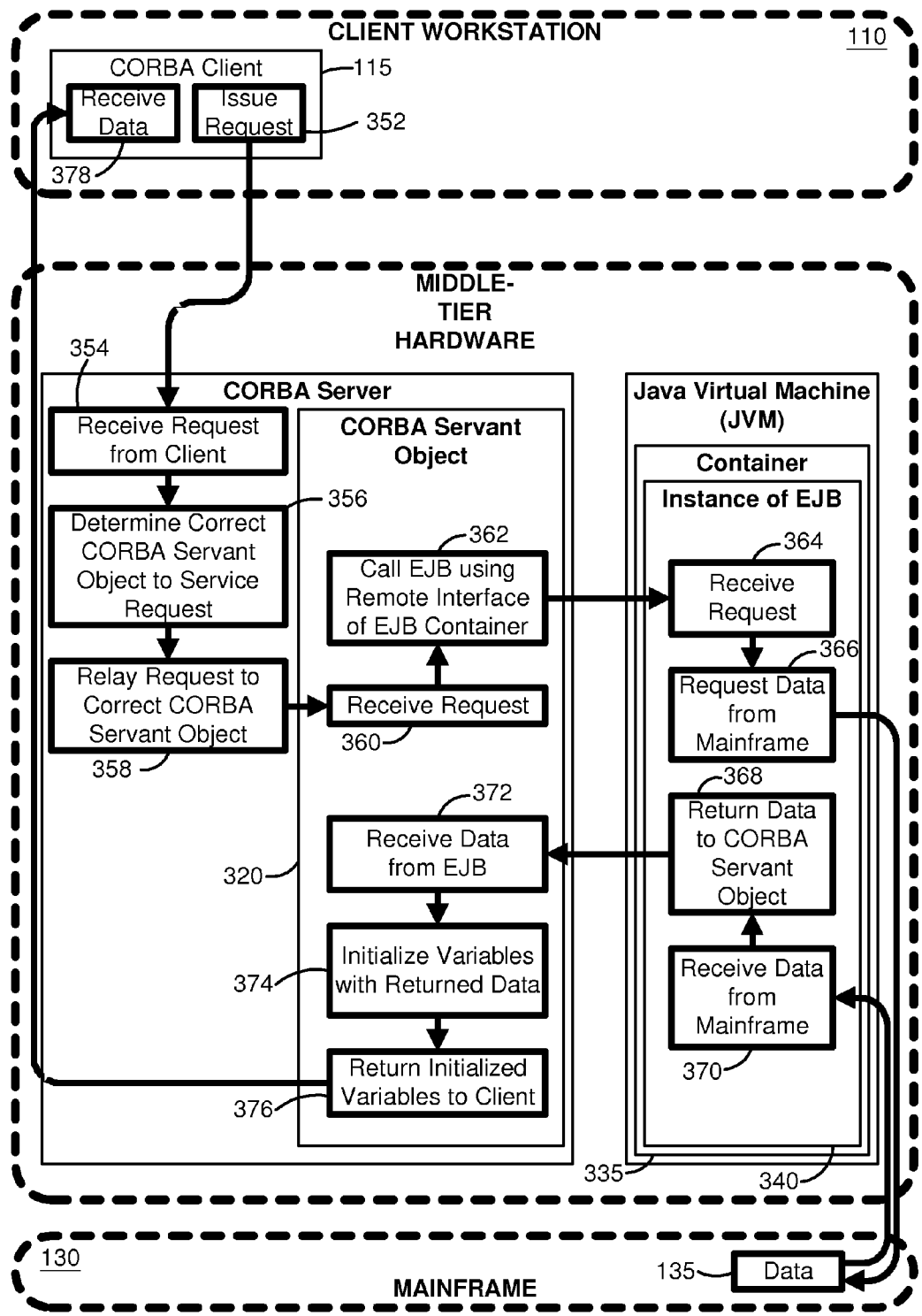
FIG. 3B is a block diagram showing an example of a request being serviced in the client-server environment of FIG. 3A.

The example of FIG. 3B shows a system where business logic is implemented using EJB while a user interface is implemented in CORBA. As shown in FIG. 3B, a CORBA client 115 located on the client workstation 110 issues (352) a request. The request may be, for example, a request to modify an existing account, a request to setup a new account, etc. The request is received (354) by the CORBA server 315 located on the middle-tier hardware 310. The CORBA server 315 determines (356) a correct CORBA servant object 320 to service the request, and relays (358) the request to the CORBA servant object 320, which receives (360) the request. Thus, for example, if the request is to modify an existing account, then a CORBA servant object for account modification would be the correct CORBA servant object 320. Similarly, if the request is to setup a new account, then a CORBA servant object for new account setup would be the correct CORBA servant object 320. In any event, since the business logic in FIG. 3B is implemented using EJB, the CORBA servant object must further call (362) an instance of an EJB to service the request. Thus, upon receiving (360) the request, the CORBA servant object 320 calls (362) the instance of the EJB 340 using the remote interface of the EJB. As is known in the art, and as described in the EJB specification, each instance of an EJB has both a remote interface and a local interface. Since the local interface can typically only be accessed by other instances of EJB or components within the same container 335, the CORBA servant object 320, which is conceptually remotely located, must access the instance of the EJB 340 using the remote interface of the instance of the EJB 340. In this regard, the call (362) to the instance of the EJB 340 by the CORBA servant 320 must be implemented using, for example, Remote Method Invocation (RMI)/Internet Inter-ORB Protocol (IIOP). In other words, according to the IIOP, which defines interoperability for CORBA, when a CORBA client issues a request to an EJB object, the CORBA client makes a call to a CORBA server, which acts as a bridge to the EJB and accesses the remote interface of the EJB using, for example, RMI/IIOP, as described in the EJB specification and the J2EE specification. This type of bridging is typically required due to data-type incompatibilities, stub/proxy incompatibilities, and namespace clashes within Java™ classes. Thus, the CORBA server that acts as the bridge will translate expressions from CORBA to Java™, thereby enabling the EJB to provide the requested service. Conceptually, this type of behavior dictates that the CORBA server become a remote client (e.g., issue calls using a remote protocol) to the EJB. Thus, currently, for each request issued by a CORBA client to an EJB, a corresponding translation from CORBA to Java™ must exist at the bridge in order for the EJB to provide the requested service.

Continuing in FIG. 3B, the instance of the EJB 340 in the container 335 receives (364) the request and further requests (366) data 135 from the mainframe 130. Thus, for example, if the request is to modify an existing account, then the existing account information on the mainframe 130 is requested (366) by the instance of the EJB 340. The data 135 is received (370) by the instance of the EJB in response to the request (366), and returned (368) to the CORBA servant object 320 by the instance of the EJB 340. The CORBA servant object 320 receives (372) the data 135 from the EJB and initializes (374) variables with the returned data 135. The initialized (374) variables are then returned (376) to the CORBA client 115, which receives (378) the data 135.

As one may guess, in order to maintain this type of interoperability, the system must continually maintain the bridge between the two protocols. Otherwise, in the absence of the bridge, interoperability is destroyed. Also, since the bridge is only as good as the map that translates between the differing protocols, the functionality of the system is limited by the protocol having less functionality (i.e., the "weaker" protocol).

Figure 4A:
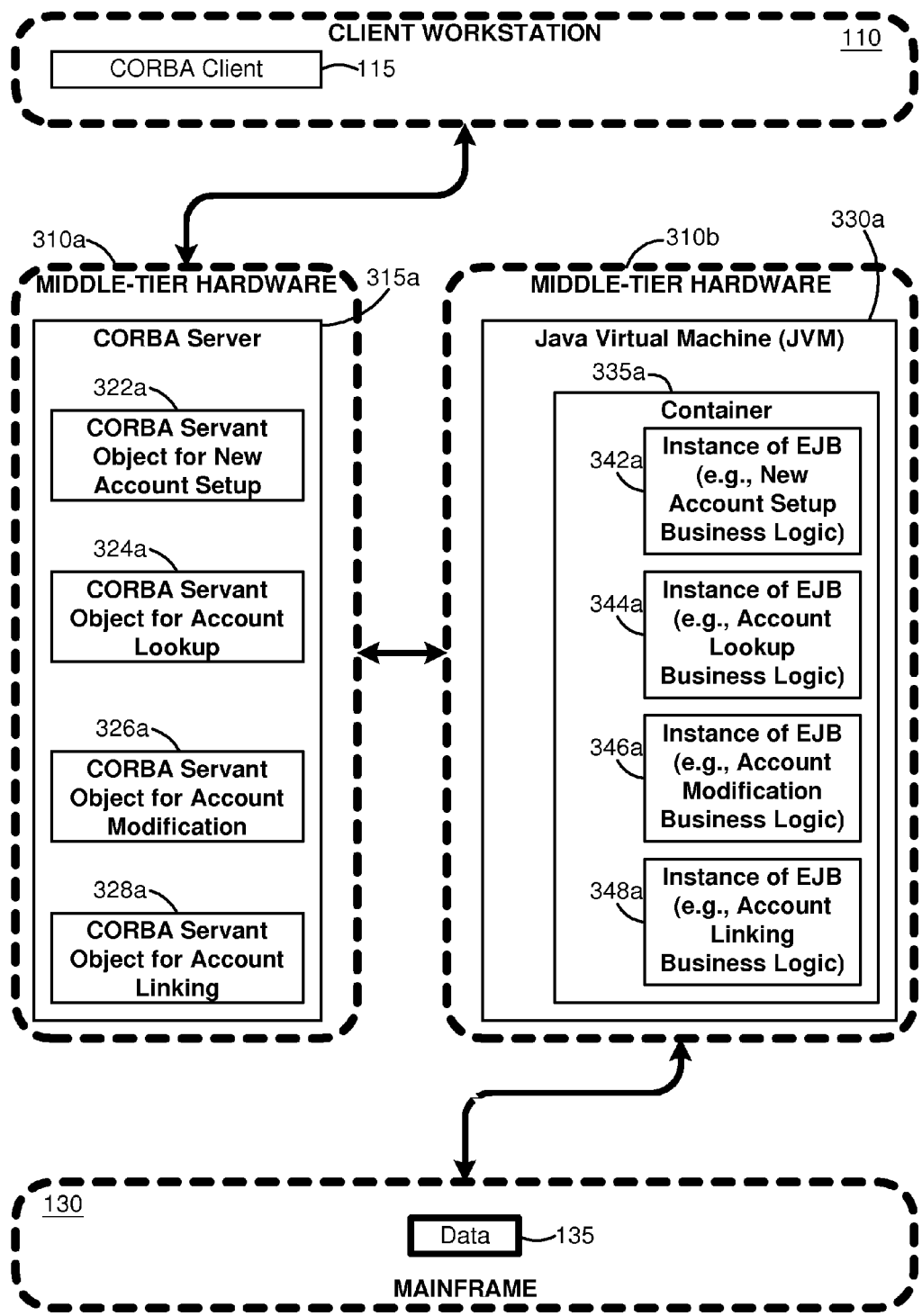
FIG. 4A is a block diagram showing an example of a distributed client-server environment implemented using both CORBA and Java™.
Figure 4B:
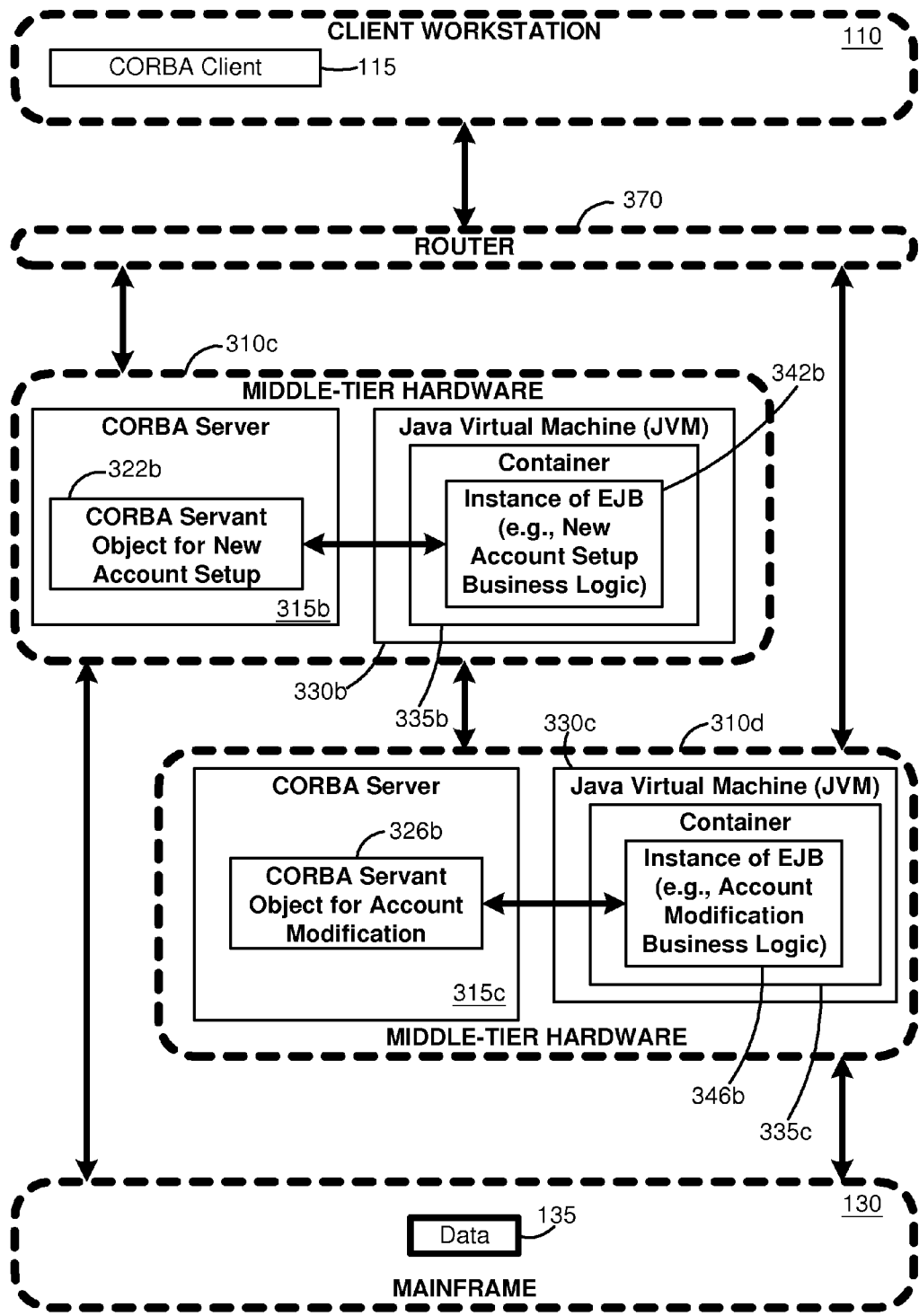
FIG. 4B is a block diagram showing another example of a distributed client-server environment implemented using both CORBA and Java™.

FIGS. 4A and 4B show further complications that may be presented if the system is implemented in a distributed network. As shown in FIG. 4A, the multiple-language environment may be a distributed system in which separate middle-tier hardware 310a, 310b exists for CORBA components and Java™ components. Similar to the environment shown in FIGS. 2A and 2B, the environment of FIG. 4A may conceptually be reduced to the environment of FIGS. 3A and 3B. While FIG. 4B shows another distributed network environment in which both Java™ and CORBA components reside on multiple middle-tier hardware 310c, 310d, even the environment of FIG. 4B may conceptually be reduced to the environment of FIGS. 3A and 3B. Regardless of whether the client-server environment is a simple environment (e.g., FIG. 3A) or a complicated environment (e.g., FIGS. 4A and 4B), the conceptual segregation of the CORBA components from the Java™ components requires a bridge to provide interoperability between CORBA and Java™.

As an alternative to translating expressions (e.g., from CORBA to Java™) at a bridge, an end user may re-write the CORBA client-side to become the EJB client-side. In other words, if an enterprise decides to migrate the business logic from CORBA to EJB, then the enterprise may re-write the CORBA client to Java™. However, this type of re-writing becomes tedious and cumbersome because each application would be re-written for each non-native platform with which interoperability is sought.

Given these inefficiencies associated with translating expressions from one protocol to another protocol using a bridge, a need exists in the industry for greater efficiency in providing interoperability between incompatible protocols.

Overcoming Deficiencies Associated with Bridging

Figure 5A:
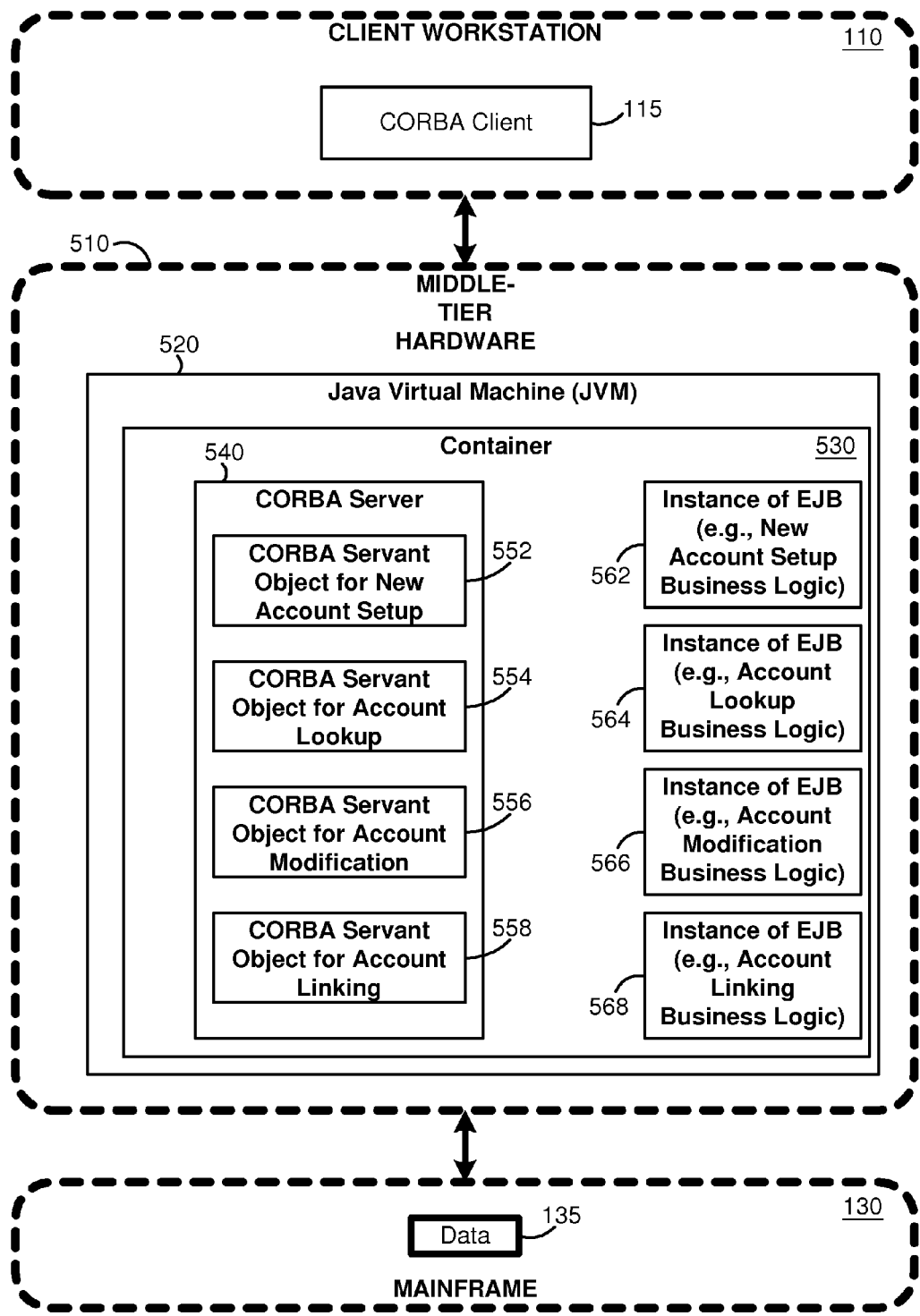
FIG. 5A is a block diagram showing a client-server environment in which CORBA and Java™ are interoperable in the absence of a bridge, in accordance with one embodiment of the invention.

FIG. 5A is a block diagram showing a client-server environment in which CORBA and Java™ are interoperable in the absence of a bridge, in accordance with one embodiment of the invention. As shown in FIG. 5A, one embodiment of the system comprises a client workstation 110, middle-tier hardware 510, and a mainframe 130. In the embodiment of FIG. 5A, a CORBA client 115 is located on the client workstation 110, and data 135 is located on the mainframe 130. In an example embodiment, such as a telecommunication system, the data 135 may include telephone numbers, addresses, billing codes, etc. As shown in FIG. 5A, multiple instances of Enterprise Java™ Beans (EJB) 562, 564, 566, 568 are instantiated in a container 530 at a Java™ Virtual Machine (JVM) on the middle-tier hardware 510. In example embodiments, each of these EJB 562, 564, 566, 568 is a business logic component that is configured to perform business logic functions such as, for example, setting up new accounts, looking up existing accounts, modifying existing accounts, linking accounts of a common owner, etc. As is known by those skilled in the art, and as described in the J2EE specification and the EJB specification, each of the Java™ components may be instantiated on the middle-tier hardware 510 during startup of the middle-tier hardware 510, or may be instantiated in response to requests generated by a client.

In addition to the instances of EJB 562, 564, 566, 568, a CORBA server 540 is instantiated in the same container 530 as the instances of EJB 562, 564, 566, 568. The CORBA server 540, in an example embodiment, is a full CORBA server capable of supporting portable object adapters (POA). Since POA are known to those skilled in the art, and also described in the CORBA specification, further details of POA are omitted here. The CORBA server 540 may be instantiated on the middle-tier hardware 510 during startup of the middle-tier hardware 510, or may be instantiated in response to requests generated by a client. As shown in FIG. 5A, since the CORBA server 540 is instantiated in the same container 530 as the instances of EJB 562, 564, 566, 568, any of the CORBA servant objects 552, 554, 556, 558 in the CORBA server 540 may now access any of the instances of EJB 562, 564, 566, 568 using the local interface of the EJB. In other words, unlike the systems shown in FIGS. 3A through 4B, which required access to the EJB through the remote interface of the EJB using RMI/IIOP (or other remote protocols), the system of FIG. 5A permits the CORBA components to have access to the EJB 562, 564, 566, 568 through the local interface of the EJB. While specific CORBA servant objects are shown in FIG. 5A, it should be understood that other CORBA components may be instantiated in the container. These CORBA components may include a root POA, a child POA (which are inherit from root POA), a POA manager, a servant manager, POA policies, servant activators, servant locator objects, etc. Additionally, the CORBA servant objects may include transient objects, persistent objects, session objects, entity objects, factory objects, etc. Since these objects are known in the art, and also are described in the CORBA specification, further details of CORBA servant objects is omitted here. In any event, it should be appreciated that a full CORBA server (having all CORBA components) may be instantiated in the container or, in the alternative, a partial CORBA server (having one or more CORBA components) may be instantiated in the container.

Figure 5B:
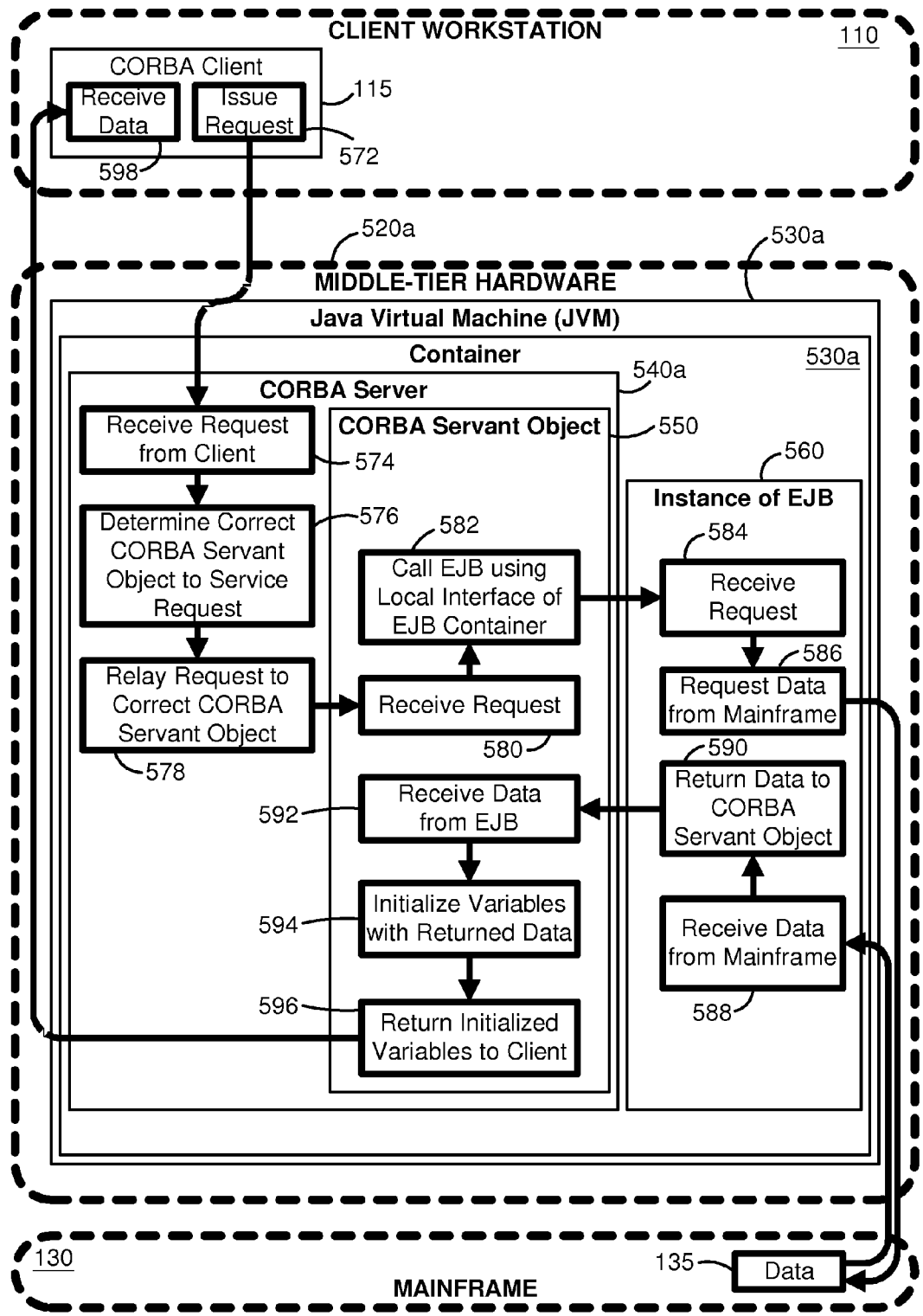
FIG. 5B is a block diagram showing an example of a request being serviced in the client-server environment of FIG. 5A.

FIG. 5B is a block diagram showing an example of a request being serviced in the client-server environment of FIG. 5A. As shown in FIG. 5B, the CORBA client 115 on the client workstation 110 issues (572) a request to the CORBA server 540a, which is instantiated in the container 530a. The CORBA server 540a may have been instantiated during startup of the middle-tier hardware 520a or it may have been instantiated in response to a request. The request may be, for example, a request to modify an existing account, a request to setup a new account, etc. The request is received (574) by the CORBA server 540a located on the middle-tier hardware 520a. The CORBA server 540a determines (576) a correct CORBA servant object 550 to service the request, and relays (578) the request to the CORBA servant object 550, which receives (580) the request. Thus, for example, if the request is to modify an existing account, then a CORBA servant object for account modification would be the correct CORBA servant object 550. Similarly, if the request is to setup a new account, then a CORBA servant object for new account setup would be the correct CORBA servant object 550. Since determination of correct CORBA servant objects is known in the art, and also described in detail in the CORBA specification, further discussion of determining correct servant objects is omitted here.

In any event, since the business logic in FIG. 5B is implemented using EJB, the CORBA servant object must further call (582) an instance of an EJB to service the request. Thus, upon receiving (580) the request, the CORBA servant object 550 calls (582) the instance of the EJB 560 using the local interface of the EJB. Since the CORBA servant object 550 is now locally located within the same container 530a, the CORBA servant object 550 may now access the instance of the EJB 560 using the local interface of the instance of the EJB 560. In this regard, the call (582) to the instance of the EJB 560 by the CORBA servant 320 may now be implemented without using remote methods such as Remote Method Invocation (RMI)/Internet Inter-ORB Protocol (IIOP). In other words, in the embodiment of FIG. 5B, there is no longer a need to translate each request issued by the CORBA client to the EJB.

Continuing in FIG. 5B, the instance of the EJB 560 in the container 530a receives (584) the request, and further requests (586) data 135 from the mainframe 130. Thus, for example, if the request is to modify an existing account, then the existing account information on the mainframe 130 is requested (586) by the instance of the EJB 560. The data 135 is received (590) by the instance of the EJB in response to the request (586), and returned (588) to the CORBA servant object 550 by the instance of the EJB 560. The CORBA servant object 550 receives (592) the data 135 from the EJB and initializes (594) variables with the returned data 135. The initialized (594) variables are then returned (596) to the CORBA client 115, which receives (598) the data 135.

As shown in FIGS. 5A and 5B, by instantiating a CORBA server 540 in the same container 530 as the instances of the EJB 560, the need for bridging or translating is circumvented, thereby increasing system performance. Additionally, the instantiation of the CORBA server 540 as a Java™ bean is fully compliant with the J2EE specification.

Figure 5C:
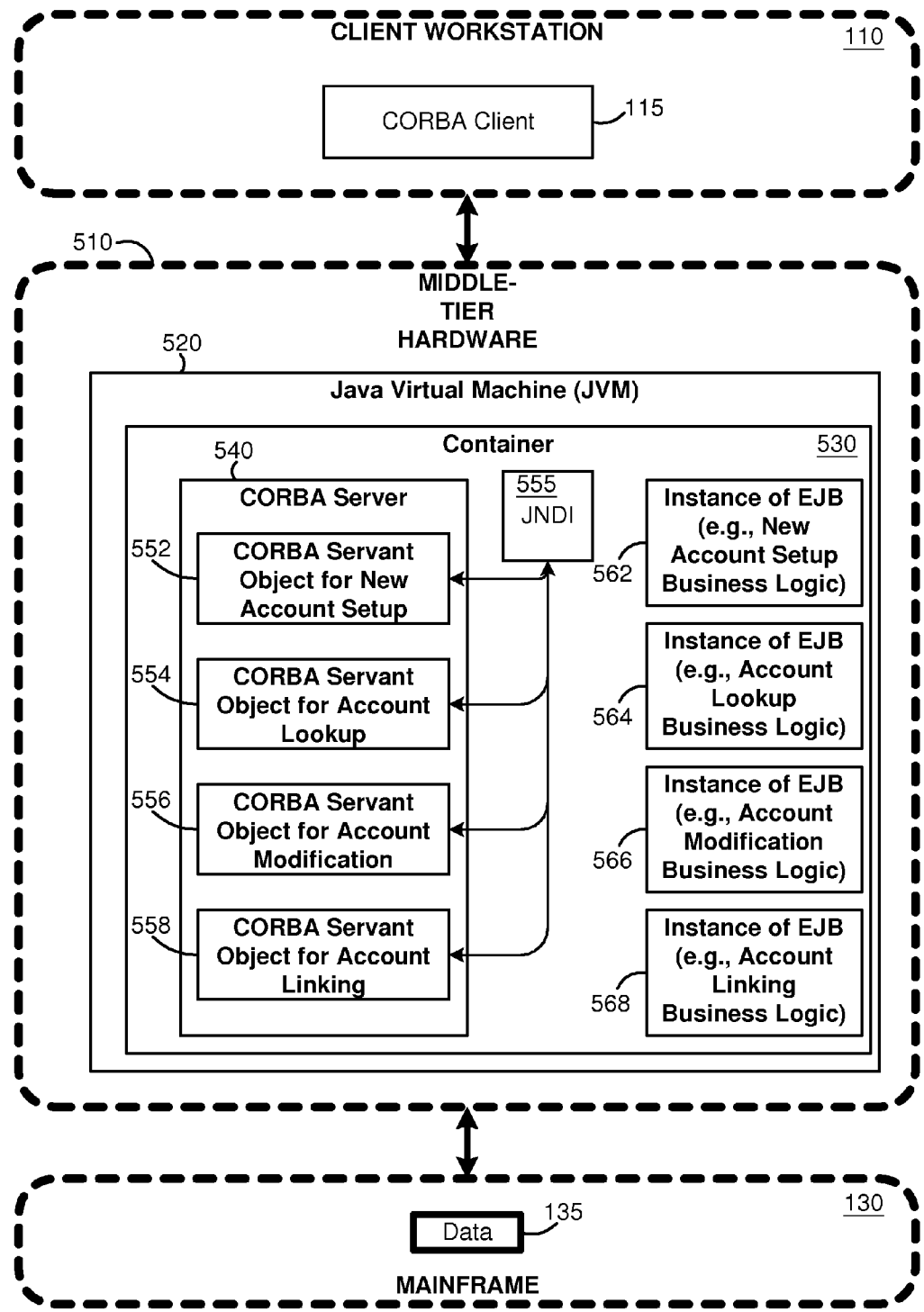
FIG. 5C is a block diagram showing another embodiment of a client-server environment in which CORBA and Java™ are interoperable.

FIG. 5C is a block diagram showing a client-server environment in which CORBA and Java™ are interoperable in the absence of a bridge, in accordance with another embodiment of the invention. As shown in FIG. 5C, one embodiment of the system comprises a client workstation 110, middle-tier hardware 510, and a mainframe 130. In the embodiment of FIG. 5C, a CORBA client 115 is located on the client workstation 110, and data 135 is located on the mainframe 130. In an example embodiment, such as a telecommunication system, the data 135 may include telephone numbers, addresses, billing codes, etc. As shown in FIG. 5C, multiple instances of Enterprise Java™ Beans (EJB) 562, 564, 566, 568 are instantiated in a container 530 at a Java™ Virtual Machine (JVM) on the middle-tier hardware 510. In example embodiments, each of these EJB 562, 564, 566, 568 is a business logic component that is configured to perform business logic functions such as, for example, setting up new accounts, looking up existing accounts, modifying existing accounts, linking accounts of a common owner, etc. As is known by those skilled in the art, and as described in the J2EE specification and the EJB specification, each of the Java™ components may be instantiated on the middle-tier hardware 510 during startup of the middle-tier hardware 510, or may be instantiated in response to requests generated by a client.

In addition to the instances of EJB 562, 564, 566, 568, a CORBA server 540 and CORBA server components 552, 554, 556, 558 are instantiated in the same container 530 as the instances of EJB 562, 564, 566, 568. In the embodiment of FIG. 5C, the CORBA server components 552, 554, 556, 558 are registered with a Java™ Naming and Directory Interface (JNDI) 555, which is also located in the container 530. The CORBA server 540, in an example embodiment, is a full CORBA server capable of supporting portable object adapters (POA). Since POA are known to those skilled in the art, and also described in the CORBA specification, further details of POA are omitted here. The CORBA server 540 may be instantiated on the middle-tier hardware 510 during startup of the middle-tier hardware 510, or may be instantiated in response to requests generated by a client. As shown in FIG. 5C, since the CORBA server 540 is instantiated in the same container 530 as the instances of EJB 562, 564, 566, 568, any of the CORBA servant objects 552, 554, 556, 558 in the CORBA server 540 may now access any of the instances of EJB 562, 564, 566, 568 using the local interface of the EJB. In other words, unlike the systems shown in FIGS. 3A through 4B, which required access to the EJB through the remote interface of the EJB using RMI/IIOP (or other remote protocols), the system of FIG. 5C permits the CORBA components to have access to the EJB 562, 564, 566, 568 through the local interface of the EJB. While specific CORBA servant objects are shown in FIG. 5C, it should be understood that other CORBA components may be instantiated in the container. These CORBA components may include a root POA, a child POA (which are inherit from root POA), a POA manager, a servant manager, POA policies, servant activators, servant locator objects, etc. Additionally, the CORBA servant objects may include transient objects, persistent objects, session objects, entity objects, factory objects, etc. Since these objects are known in the art, and also are described in the CORBA specification, further details of CORBA servant objects is omitted here. In any event, it should be appreciated that a full CORBA server (having all CORBA components) may be instantiated in the container or, in the alternative, a partial CORBA server (having one or more CORBA components) may be instantiated in the container.

Figure 5D:
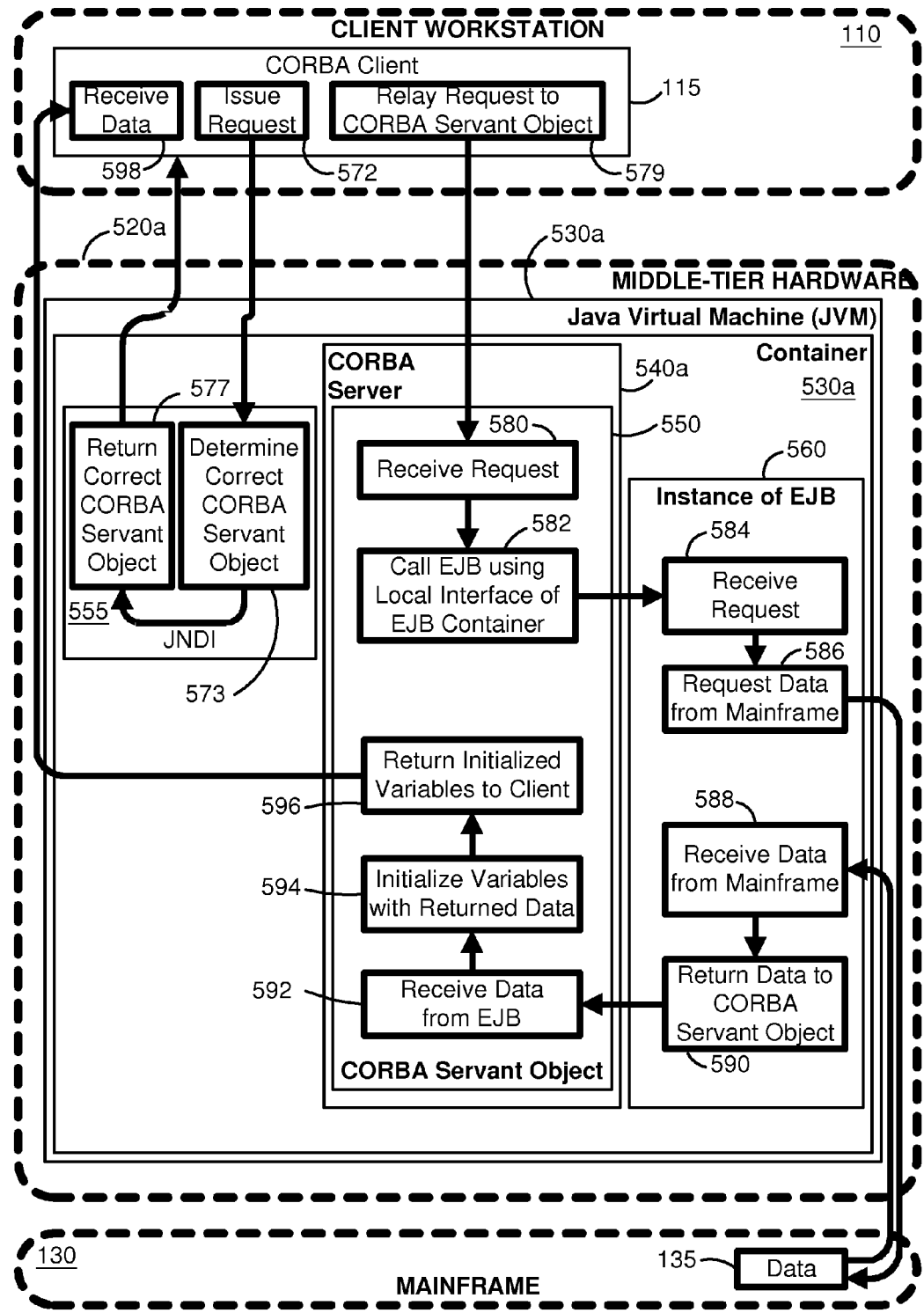
FIG. 5D is a block diagram showing an example of a request being serviced in the client-server environment of FIG. 5C.

FIG. 5D is a block diagram showing an example of a request being serviced in the client-server environment of FIG. 5C. As shown in FIG. 5D, the CORBA client 115 on the client workstation 110 issues (572) a request. The JNDI 555 in the container 530 determines (573) a correct CORBA servant object 550 to service the request, and returns (577) the correct CORBA servant object 550 to the CORBA client 115. The CORBA client 115 then relays (579) the request to the CORBA servant object 550, which receives (580) the request. Thus, for example, if the request is to modify an existing account, then a CORBA servant object for account modification would be the correct CORBA servant object 550. Similarly, if the request is to setup a new account, then a CORBA servant object for new account setup would be the correct CORBA servant object 550. Since determination of correct CORBA servant objects is known in the art, and also described in detail in the CORBA specification, further discussion of determining correct servant objects is omitted here. Additionally, since the function of the JNDI 555 is known in the art, and also described in detail in the J2EE specification, further discussion of the JNDI 555 is also omitted here.

In any event, since the business logic in FIG. 5D is implemented using EJB, the CORBA servant object must further call (582) an instance of an EJB to service the request. Thus, upon receiving (580) the request, the CORBA servant object 550 calls (582) the instance of the EJB 560 using the local interface of the EJB. Since the CORBA servant object 550 is now locally located within the same container 530a, the CORBA servant object 550 may now access the instance of the EJB 560 using the local interface of the instance of the EJB 560. In this regard, the call (582) to the instance of the EJB 560 by the CORBA servant 320 may now be implemented without using remote methods such as Remote Method Invocation (RMI)/Internet Inter-ORB Protocol (IIOP). In other words, in the embodiment of FIG. 5D, there is no longer a need to translate each request issued by the CORBA client to the EJB.

Continuing in FIG. 5D, the instance of the EJB 560 in the container 530a receives (584) the request, and further requests (586) data 135 from the mainframe 130. Thus, for example, if the request is to modify an existing account, then the existing account information on the mainframe 130 is requested (586) by the instance of the EJB 560. The data 135 is received (590) by the instance of the EJB in response to the request (586), and returned (588) to the CORBA servant object 550 by the instance of the EJB 560. The CORBA servant object 550 receives (592) the data 135 from the EJB and initializes (594) variables with the returned data 135. The initialized (594) variables are then returned (596) to the CORBA client 115, which receives (598) the data 135.

As shown in FIGS. 5C and 5D, by instantiating a CORBA server 540 in the same container 530 as the instances of the EJB 560, the need for bridging or translating is circumvented, thereby increasing system performance. Additionally, the instantiation of the CORBA server 540 as a Java™ bean is fully compliant with the J2EE specification.

In an example embodiment, the CORBA server 540 is instantiated in the servlet context and, thus, initializes the servlet context with parameters that are passed back and forth from any application that it may call. Also, as shown in FIG. 5B, CORBA clients may simply request an object reference from a standard naming server (e.g., CosNaming, Java™ Naming and Directory Interface (JDNI), etc.) and then invoke the CORBA server without knowledge of where the server or its objects are located. In this regard, CORBA components may incorporate Java™ beans or, in some cases, become a wrapper for a Java™ bean. Thus, CORBA clients only need the IDL for the interfaces with which they will interact, thereby creating a loosely coupled integration between CORBA and Java™, which results in an independent operation of the CORBA server from the container. The CORBA server, therefore, need not have knowledge of the container in which the CORBA server is running. Additionally, the life cycle of the CORBA component is managed by standard mechanisms outlined in the J2EE specification.

Figure 6:
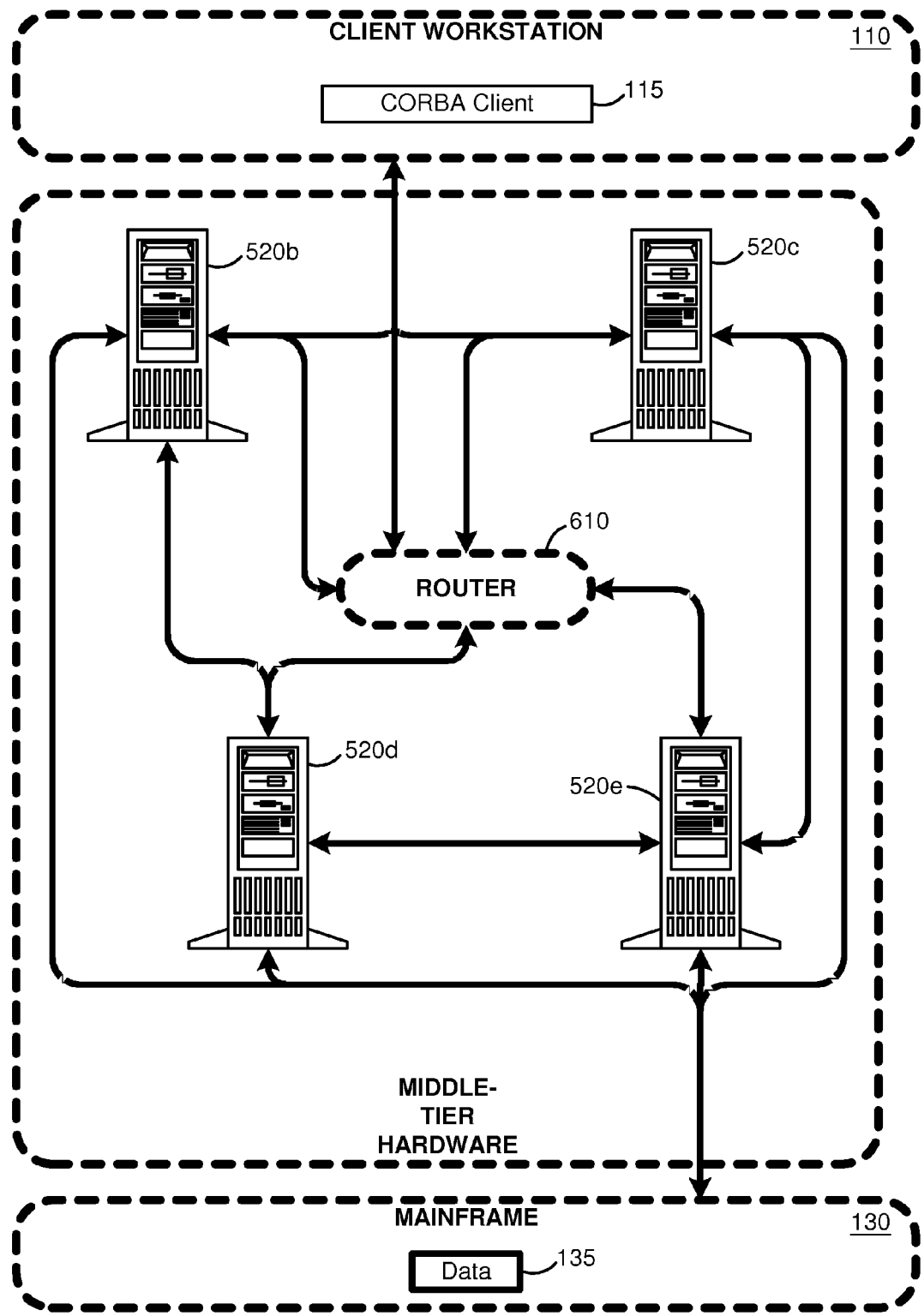
FIG. 6 is a block diagram showing an example of a distributed client-server in which CORBA and Java™ are interoperable in the absence of a bridge, in accordance with one embodiment of the invention.

FIG. 6 is a block diagram showing an example of a distributed client-server in which CORBA and Java™ are interoperable in the absence of a bridge, in accordance with one embodiment of the invention. Unlike FIG. 5B, which shows only one middle-tier hardware 520a, FIG. 6 shows distributed middle-tier hardware 520b, 520c, 520d, 520e. Thus, in architecture, the embodiment of FIG. 6 comprises a client workstation 110, a mainframe 130, and distributed middle-tier hardware 520b, 520c, 520d, 520e. A CORBA client 115 is located on the client workstation 110 while data 135 is located at the mainframe 130. Since the middle-tier hardware 520b, 520c, 520d, 520e is distributed, the embodiment of FIG. 6 also comprises a router, which determines the middle-tier hardware 520b, 520c, 520d, 520e having the appropriate business logic to execute a particular request. Despite the potential complexity of the system, the distributed network of FIG. 6 may be conceptually reduced to the embodiments of FIGS. 5A and 5B.

In any event, it should be appreciated by those of skill in the art that, regardless of whether or not the environment is a distributed network, the instantiation of the CORBA server 540 in the same container 530 as the instance of the EJB 560 provides for access to the local interface of the EJB by the CORBA servant objects 550 in the CORBA server 540.

Figure 7A:
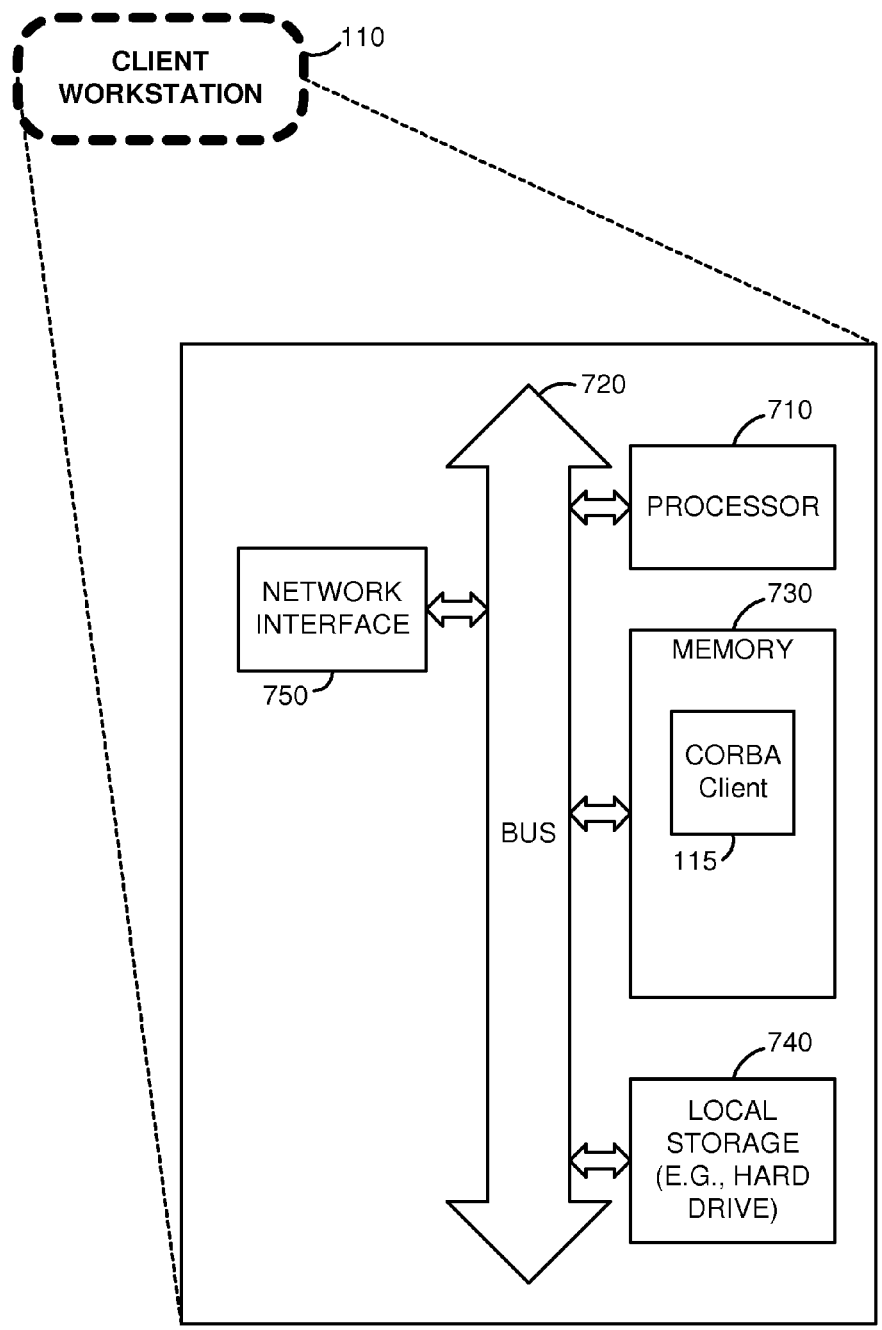
FIG. 7A is a block diagram showing component level architecture of an example client workstation, as shown in FIG. 6, in accordance with one embodiment of the invention.

FIG. 7A is a block diagram showing component level architecture of an example client workstation 110, in accordance with one embodiment of the invention. As shown in FIG. 7A, the client workstation 110 comprises a system board that includes a processor 710, a network interface 750, a memory 730, a local storage device 740, and a bus 720 that permits communication between the various components. In an example embodiment, the local storage device 740 may be a hard drive configured to electronically store data. The local storage device 740 may also store computer programs that execute on the client workstation 110. In this sense, the processor 710 is configured to access any program that is stored on the local storage device 740, and execute the program with the assistance of the memory 730. As shown in FIG. 7A, the memory 730, in one embodiment, includes the CORBA client 115. Since the functioning of computing devices is well known in the art, further discussion of the processor 710, the memory 730, and the local storage device 740 are omitted here. While the various components are shown as residing on a single system board, it will be clear to one of ordinary skill in the art that the various components may reside at different locations, so long as they are coupled to each other to allow communication between the components.

The network interface 750 of FIG. 7A is configured to provide an interface between the client workstation 110 and the middle-tier hardware 520 or the router 610. Thus, the network interface 750 provides the interface for the client workstation 110 to receive any data that may be entering from the middle-tier hardware 520 or the router 610 and, also, to transmit any data from the client workstation 110 to the middle-tier hardware 520 or the router 610. In this regard, the network interface 750 may be a modem, a network card, or any other interface that interfaces the client workstation 110 to a network.

Figure 7B:
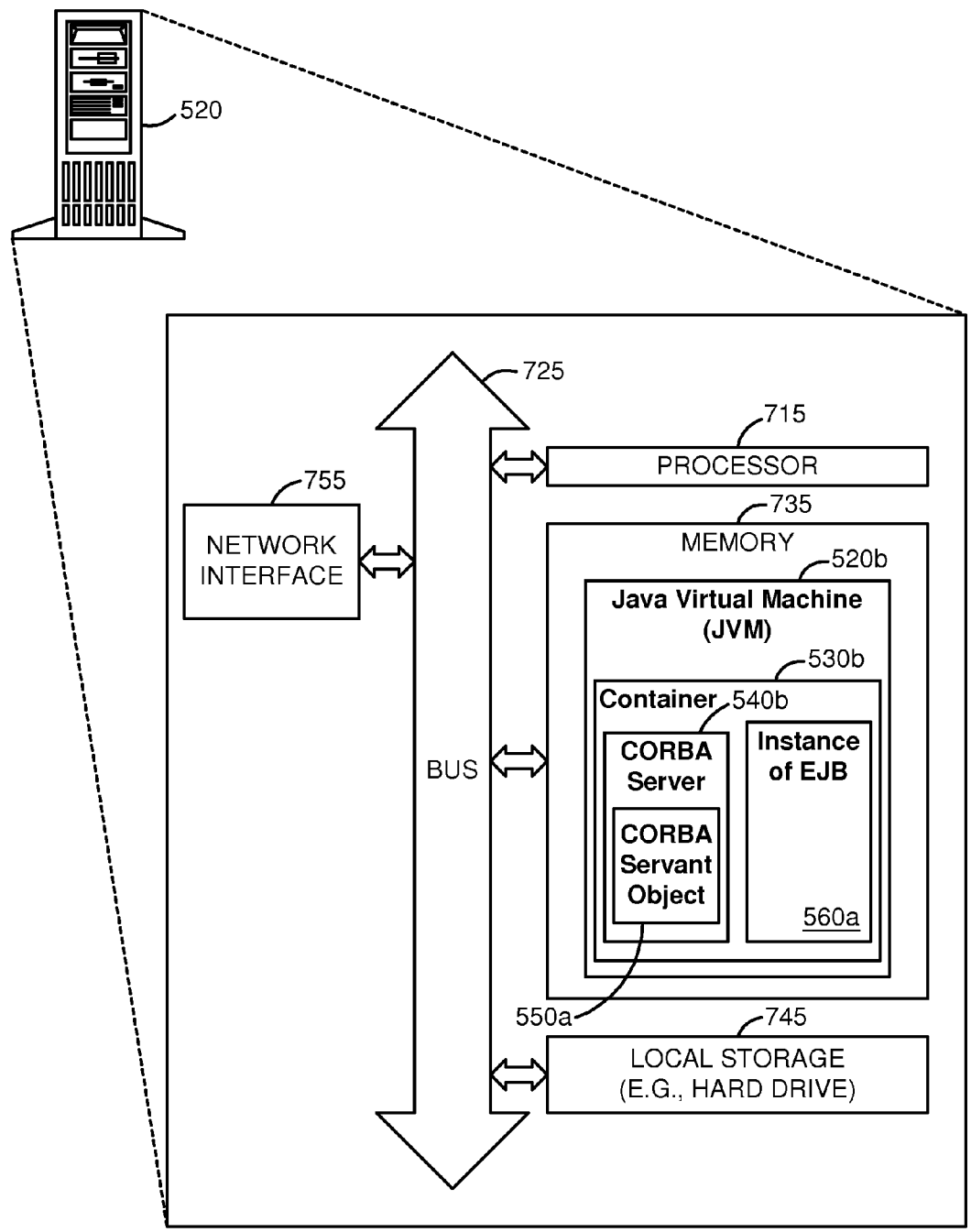
FIG. 7B is a block diagram showing component level architecture of an example middle-tier hardware, as shown in FIG. 6, in accordance with one embodiment of the invention.

FIG. 7B is a block diagram showing component level architecture of example middle-tier hardware 520, in accordance with one embodiment of the invention. As shown in FIG. 7B, the middle-tier hardware 520 comprises a system board that includes a processor 715, a network interface 755, a memory 735, a local storage device 745, and a bus 725 that permits communication between the various components. In an example embodiment, the local storage device 745 may be a hard drive configured to electronically store data. The local storage device 745 may also store computer programs that execute on the middle-tier hardware 520. In this sense, the processor 715 is configured to access any program that is stored on the local storage device 745, and execute the program with the assistance of the memory 735. As shown in FIG. 7B, the memory 730, in one embodiment, includes the CORBA server 540b and the CORBA servant object 550a collocated in the same container 530b with the instance of the EJB 560a. In the embodiment of FIG. 7B, the container 530b is running on a JVM 520b in the memory 735. Since the functioning of computing devices is well known in the art, further discussion of the processor 715, the memory 735, and the local storage device 745 are omitted here. While the various components are shown as residing on a single system board, it will be clear to one of ordinary skill in the art that the various components may reside at different locations, so long as they are coupled to each other to allow communication between the components.

The network interface 755 of FIG. 7B is configured to provide an interface between the middle-tier hardware 520 and the client workstation 110 or the router 610. Thus, the network interface 755 provides the interface for the middle-tier hardware 520 to receive any data that may be entering from the client workstation 110 or the router 610 and, also, to transmit any data from the middle-tier hardware 520 to the client workstation 110 or the router 610. In this regard, the network interface 755 may be a modem, a network card, or any other interface that interfaces the middle-tier hardware 520 to a network.

Figure 8:
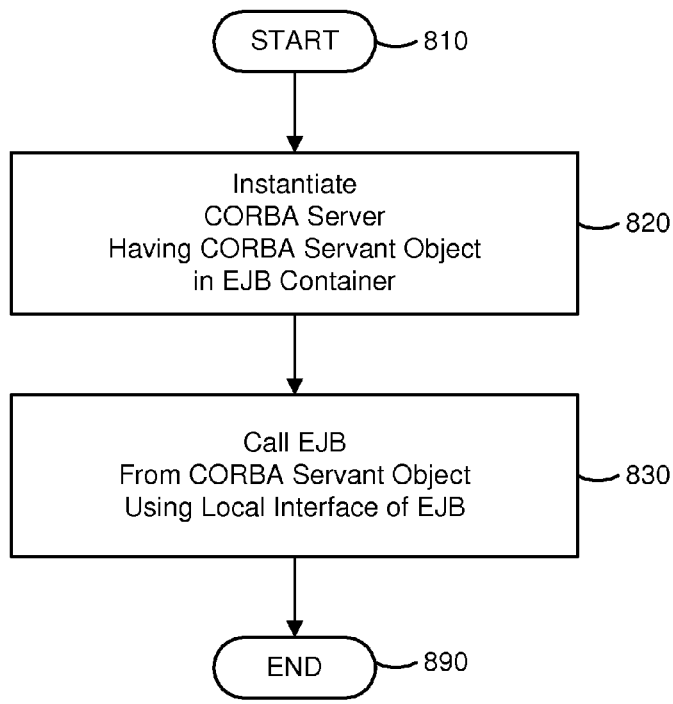
FIG. 8 is a flowchart showing method steps in accordance with one embodiment of the invention.

FIG. 8 is a flowchart showing method steps in accordance with one embodiment of the invention. As shown in FIG. 8, one embodiment of the method comprises the step of instantiating (820) a CORBA server in an EJB container. In one embodiment, the CORBA server has a CORBA servant object. The CORBA server and the CORBA servant object may be instantiated (820) in the EJB container during startup, or the CORBA servant object and CORBA server may be instantiated in response to a request. The method of FIG. 8 further comprises the step of calling (830) the EJB from the CORBA servant object using the local interface of the EJB. In an example embodiment, the method steps of FIG. 8 may be implemented in the systems described with reference to FIGS. 5A through 7B.

Figure 9:
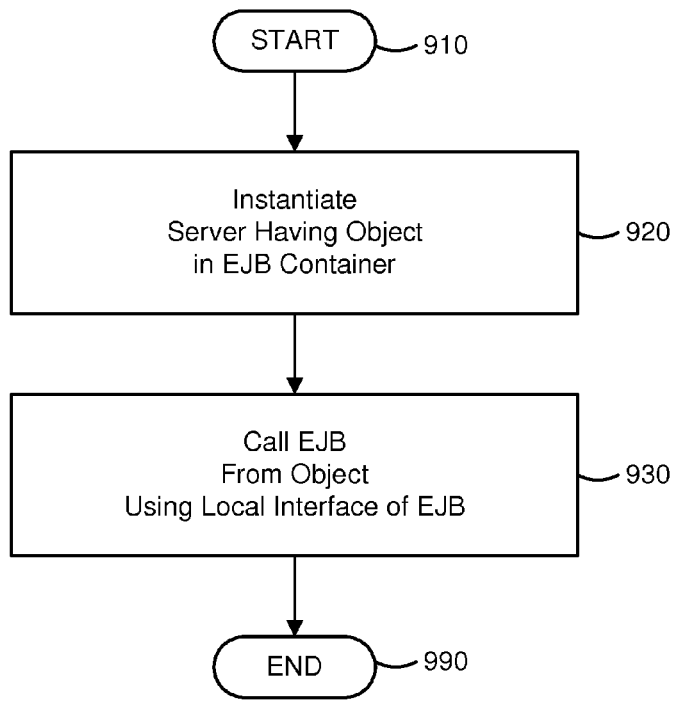
FIG. 9 is a flowchart showing method steps in accordance with one embodiment of the invention.

FIG. 9 is a flowchart showing method steps in accordance with one embodiment of the invention. The embodiment of FIG. 9 provides a broader perspective in which an instantiated server need not specifically be a CORBA server. As shown in FIG. 9, one embodiment of the method comprises the step of instantiating (920) a server in an EJB container. In one embodiment, the server has a servant object. The server and the servant object may be instantiated (920) in the EJB container during startup, or the servant object and server may be instantiated in response to a request. The method of FIG. 9 further comprises the step of calling (930) the EJB from the servant object using the local interface of the EJB. In an example embodiment, the method steps of FIG. 9 may be implemented in the systems described with reference to FIGS. 5A through 7B.

As shown in the processes of FIGS. 8 and 9, by instantiating a server within the same container as the EJB, the local interface of the EJB may be used to access the EJB, thereby removing any need for bridging or remote protocols such as RMI/IIOP.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while specific examples of CORBA and Java™ have been used to illustrate translations between two different protocols, it will be clear to one of ordinary skill in the art that the systems and methods presented herein may be extended to systems that seek interoperability between non-Java™-based messaging systems and Java™. In this regard, it will be clear to one of ordinary skill in the art that any container or "containerized client" may be used to provide interoperability between two systems having different operating protocols. Also, while specific CORBA servant objects are instantiated in the embodiments above, it should be understood that any and all server components may be instantiated during startup or in response to requests. In this regard, the servant objects depicted in FIGS. 5A and 5B may be seen as specific non-limiting examples of server components. All such changes, modifications, and alterations should therefore be seen as within the scope of the present invention.

We claim:

1. In a distributed network, a method comprising:
instantiating a Java™ Bean within a container;
instantiating a Common Object Request Broker Architecture server within the container;
responsive to servicing a received request for data from a client workstation, locally calling the Java™ Bean from the Common Object Request Broker Architecture server using a local interface of the Java™ Bean to provide the data requested; and
providing the data returned from the Java™ Bean to the client workstation.

2. The method of claim 1, wherein the container comprises a Java™ Bean container.

3. The method of claim 1, further comprising:
instantiating all Common Object Request Broker Architecture server components within the container.

4. The method of claim 1, further comprising:
instantiating a Common Object Request Broker Architecture servant object within the container to service the received request, wherein the Common Object Request Broker Architecture servant object is configured to access the Java™ Bean using the local interface of the Java™ Bean.

5. The method of claim 1, wherein the Common Object Request Broker Architecture server is instantiated as the Java™ Bean.

6. The method of claim 1, further comprising instantiating a Common Object Request Broker Architecture server component within the container,
wherein the server component is selected from a group consisting of: a root portable object adapter; a child portable object adapter; a portable object adapter manager; a servant manager; a portable object adapter policy; a transient object; a persistent object; a session object; an entity object; a factory object; a servant activator; and a servant locator object.

7. The method of claim 1, wherein the Common Object Request Broker Architecture server calls a second Java™Bean located in a second container using a remote interface of the second Java™ Bean.

8. A system comprising:
a computer processor;
a Java™ Bean within a container instantiated by the computer processor; and
a Common Object Request Broker Architecture server instantiated by the computer processor within the container,
wherein the Common Object Request Broker Architecture server is configured to locally call the Java™ Bean using a local interface of the Java™ Bean.

9. The system of claim 8, wherein the container comprises a Java™ Bean container.

10. The system of claim 8, further comprising:
a plurality of Common Object Request Broker Architecture server components within the container.

11. The system of claim 8, further comprising:
a Common Object Request Broker Architecture servant object within the container configured to service a received request, wherein the Common Object Request Broker Architecture servant object is configured to access the Java™ Bean using the local interface of the Java™ Bean.

12. The system of claim 8, wherein the Common Object Request Broker Architecture server is instantiated as the Java™ Bean.

13. The system of claim 8, further comprising a Common Object Request Broker Architecture server component instantiated within the container,
wherein the server component is selected from a group consisting of: a root portable object adapter; a child portable object adapter; a portable object adapter manager; a servant manager; a portable object adapter policy; a transient object; a persistent object; a session object; an entity object; a factory object; a servant activator; and a servant locator object.

14. The system of claim 8, wherein the Common Object Request Broker Architecture server is configured to call a second Java™ Bean located in a second container using a remote interface of the second Java™ Bean.

15. A non-transitory computer-readable medium having a computer program that is executable a computer, the computer program comprising:
code to instantiate a Java™ Bean within a container;
code to instantiate a Common Object Request Broker Architecture server within the container;
code, to responsive to servicing a received request for data from a client workstation, locally call the Java™ Bean from the Common Object Request Broker Architecture server using a local interface of the Java™ Bean to provide the data requested; and
code to provide the data returned from the Java™ Bean to the client workstation.

16. The non-transitory computer-readable medium of claim 15, wherein the container comprise a Java™ Bean container.

17. The non-transitory computer-readable medium of claim 15, the computer program further comprising:
code to instantiate all Common Object Request Broker Architecture server components within the container.

18. The non-transitory computer-readable medium of claim 15, the computer program further comprising:
code to instantiate a Common Object Request Broker Architecture servant object within the container to service the received request, wherein the Common Object Request Broker Architecture servant object is configured to access the Java™ Bean using the local interface of the Java™ Bean.

19. The non-transitory computer-readable medium of claim 15, wherein the Common Object Request Broker Architecture server is instantiated as the Java™ Bean.

20. The non-transitory computer-readable medium of claim 15, the computer program further comprising code to instantiate a Common Object Request Broker Architecture server component within the container,
wherein the server component is selected from a group consisting of: a root portable object adapter; a child portable object adapter; a portable object adapter manager; a servant manager; a portable object adapter policy; a transient object; a persistent object; a session object; an entity object; a factory object; a servant activator; and a servant locator object.

* * * * *